United States Patent [19]
Yamaguchi et al.

[11] Patent Number: 5,929,980
[45] Date of Patent: Jul. 27, 1999

[54] DISTANCE MEASURING APPARATUS AND SHAPE MEASURING APPARATUS

[75] Inventors: Hiroyoshi Yamaguchi; Tatsuya Ariga; Tetsuya Shinbo; Osamu Yoshimi, all of Hiratsuka, Japan

[73] Assignee: Komatsu, Ltd., Tokyo, Japan

[21] Appl. No.: 09/017,938

[22] Filed: Feb. 3, 1998

[51] Int. Cl.$^6$ .............................. G01C 3/08; G01C 11/12; G01B 11/24; G06K 9/48

[52] U.S. Cl. .............................. 356/4.03; 356/376; 356/2; 382/199

[58] Field of Search .................................. 356/3.06, 3.07, 356/3.14, 376, 141.1, 139.03, 4.03; 382/199

[56] References Cited

U.S. PATENT DOCUMENTS

| | | |
|---|---|---|
| 3,617,128 | 11/1971 | Harvey . |
| 3,746,454 | 7/1973 | Pace et al. . |
| 3,918,814 | 11/1975 | Weiser . |
| 3,953,131 | 4/1976 | Britz . |
| 4,514,084 | 4/1985 | Makino et al. . |
| 4,695,156 | 9/1987 | Taft . |
| 4,842,411 | 6/1989 | Wood ...................................... 356/376 |
| 5,196,900 | 3/1993 | Pettersen . |
| 5,528,358 | 6/1996 | Bjorkman et al. .................... 356/141.1 |

*Primary Examiner*—Stephen C. Buczinski
*Attorney, Agent, or Firm*—Welsh & Katz, Ltd.

[57] ABSTRACT

A small-sized precision distance measuring apparatus. When a laser beam 1b reflected from an article is received on a photodetector array (30) through a lens array (20), the effective area of the photodetector array (30) is calculated on the basis of the output from the photodetectors, and the distance from the lens array (20) to the article 11 is calculated from the calculated area and the angle of view of the lenses constituting the lens array (20). If pixels (33a, 33b, 33c) of an image on a sensor array, corresponding to the coordinates of elements in the space (12), are determined on the basis of the positional relationship between the lenses (41a, 41b, 41c) of a lens array and photodetectors (51a, 51b, 51c) of the sensor array, the comparison of image information on the pixels (33a, 33b, 33c) can be made to determine the coordinate positions representing the profile of the article 11 from the coordinate positions of the space (12), thereby determining the distance to the article (11) and its shape. The measuring apparatus is used on a moving body, a robot or the like.

23 Claims, 19 Drawing Sheets

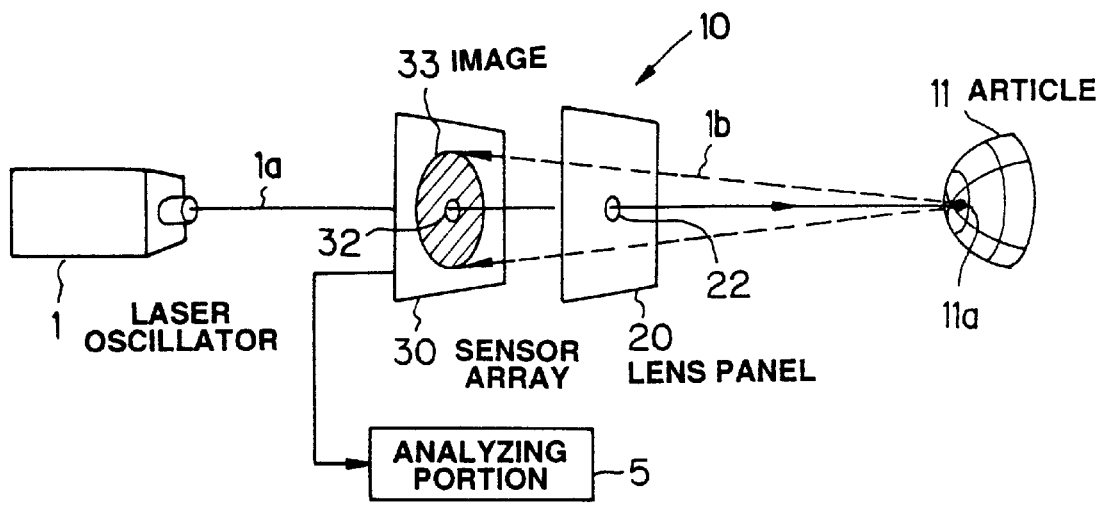
FIG.1
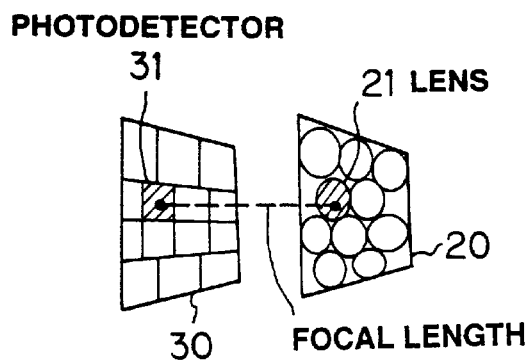
FIG.2
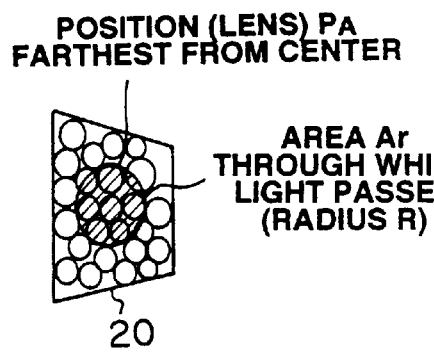 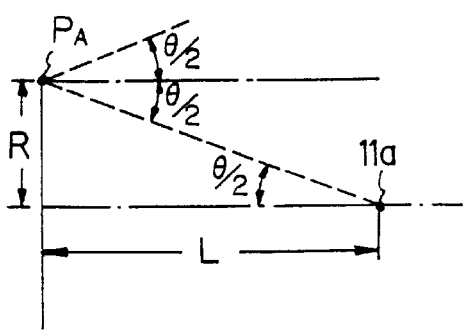
FIG.3(a) FIG.3(b)

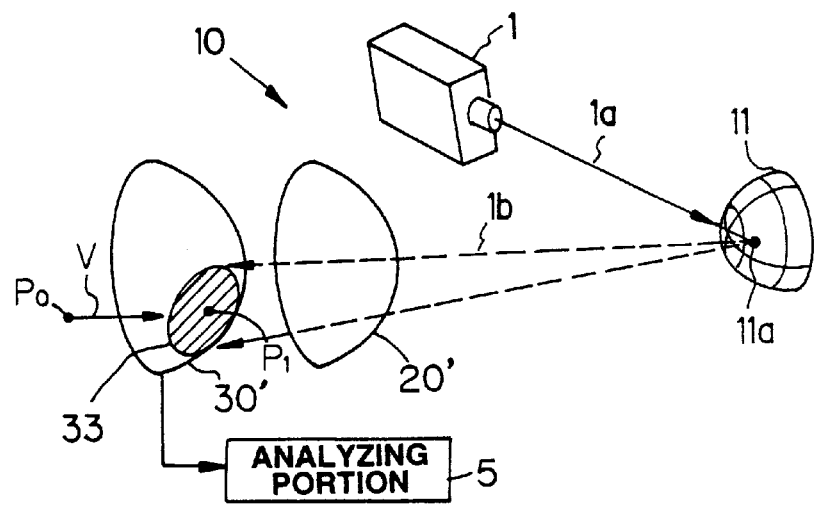
FIG.4
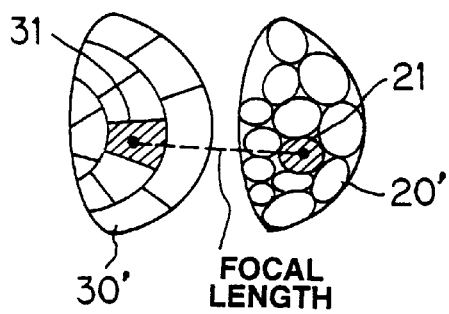
FIG.5
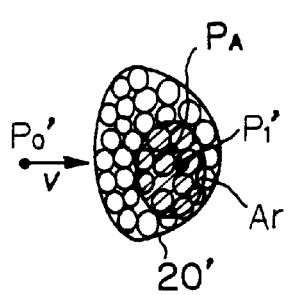  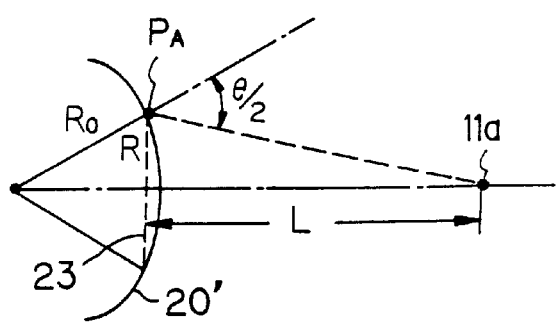
FIG.6(a)   FIG.6(b)

•: IMAGE INFORMATION

∘: CORRESPONDING POINT

•: CHARACTERISTIC POINT    ∘: CANDIDATE CORRESPONDING POINT

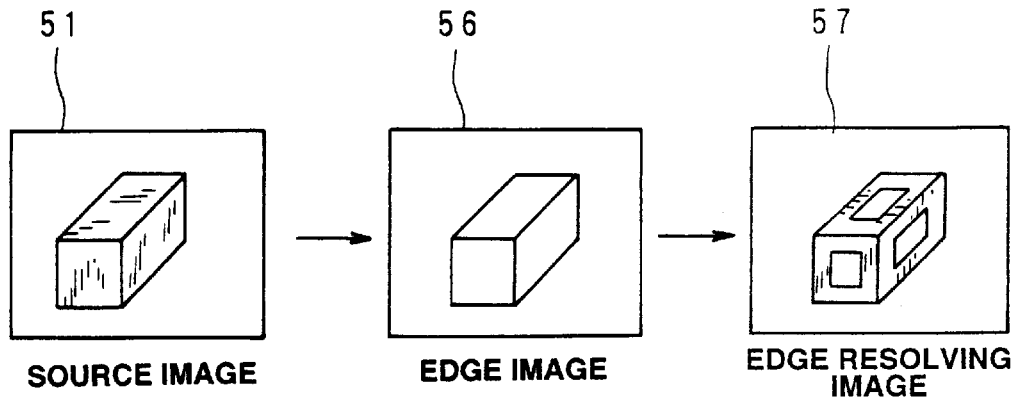
FIG.26
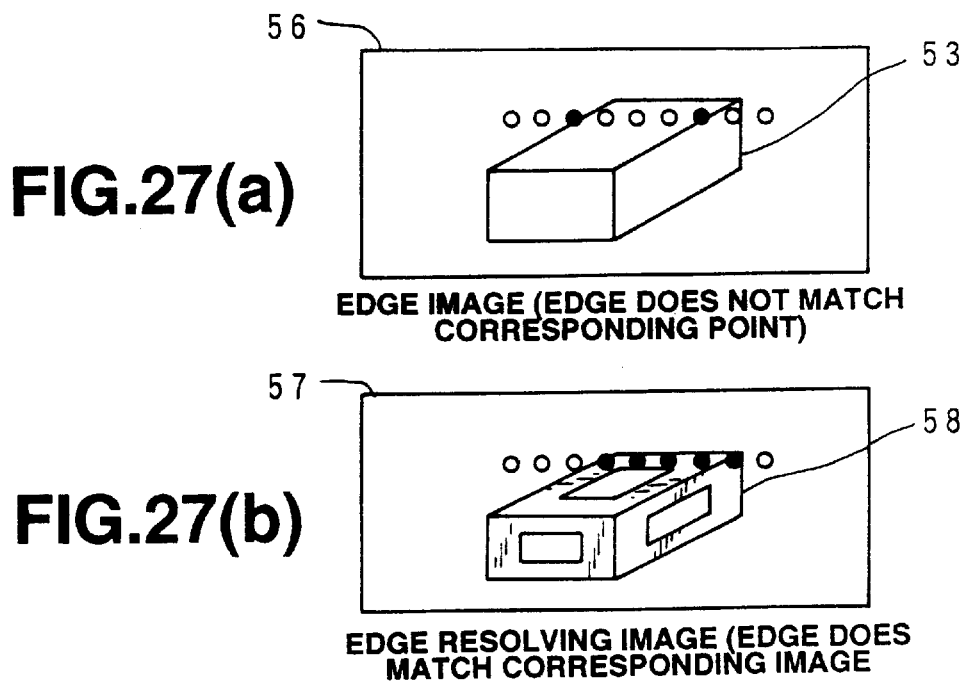
FIG.27(a)
FIG.27(b)

FIG.28(c)

ARROW A

DISTANCE MEASURING APPARATUS AND SHAPE MEASURING APPARATUS

TECHNICAL FIELD

The present invention relates to an apparatus for measuring the distance to an article from a reference plane and the shape of the article by receiving light reflected from the object; the present invention relates to an apparatus optimum for use in the case of a robot confirming a work subject, for example.

BACKGROUND ART

The prior art for measuring the meter-range distance to an article outdoors or indoors using a laser beam includes the following measurement methods.

1) Method using an optical radar range finder
2) Active stereo method

The method using an optical radar range finder is a distance measuring method of beaming a laser beam to an article and measuring the time until that reflected light returns; the advantage of this method is that it can rapidly measure distant articles.

On the other hand, the active stereo method is a distance measuring method of beaming a laser beam to an article with a laser apparatus, imaging that with a camera, and measuring the distance by triangulation; the advantage of this method is that it can realize distance measurement with a simple apparatus. Also, the prior art for measuring meter-range distance to an article which is outdoors or indoors includes the following measuring method.

3) Stereo vision

This stereo vision method finds corresponding points in two image data and measures distance through triangulation; the advantage of this method is that it can realize distance measurement with a simple apparatus.

The method with an optical radar range finder may only measure the time for the reflected light to return, but the measurement apparatus is large and complex; it also requires precise calibration.

On the other hand, the active stereo method can effect distance measurement with an apparatus having a comparatively simple constitution; however, precision is required in the positional relationship of the camera and laser apparatus and the measurement of angle of view of the laser. In effect it requires precise calibration. Also, the laser apparatus and camera must be separated by a large distance because it is necessary to perform triangulation. Out of necessity, the entire apparatus becomes large.

In this way, the distance measuring apparatus relating to the prior art requires precise calibration of the apparatus; therefore a problem is that the precision of distance measurement itself decreases when precise calibration cannot be carried out. Another problem is that the space occupied becomes large because the apparatus as a whole becomes large in size.

Therefore it is a first object of the present invention to provide a distance measuring apparatus wherein problems such as requiring much space are avoided through the reduction of the overall size of the apparatus, which is able to effect distance measurement precisely, even without sufficient calibration.

The aforementioned method using an optical radar range finder has the advantage of being able to measure long distances rapidly; however this method is unable to effect distance measurement accurately in an environment where the light is absorbed and scattered in the propagation path of the laser beam or when the laser beam is entirely reflected by the surface of the article.

Also, this method essentially effects point measurement, measuring the distance to one point of the article. For this reason it requires a mechanism to scan the laser beam for measuring the shape of a large article or measuring a wide range on an article. In this case, the scanning requires more time and the apparatus as a whole becomes more complex because of the added scanning mechanism.

On the other hand, the method using stereo vision can effect distance measurement with a comparatively simple apparatus; however, it is very difficult to match screens for triangulation. Of course a match is not necessary when the subject article is one point, but that is an unusual case. Matching is impossible for a complex article and the calculation time necessary for matching becomes very long.

In this way, the conventional distance measuring apparatus basically measures the distance to one point; measuring the distance to the surface of a complex object results in the following problems: the apparatus becomes complex and the time for scanning the laser beam and calculations for distance measurement becomes very long.

It is a second object of the present invention to enable a distance measurement with an apparatus having a simple constitution and enable to complete the measurement in a short period of time without requiring time for calculations, etc., even when measuring the distance to the surface of a complex article.

Technology to measure the distance to an article from the results of imaging the article with a plurality of cameras has been noted in Japanese Patent Laid-open Publication No. 61-66107 and Japanese Patent Laid-Open Publication No. 6-241749.

This technology is explained with reference to FIG. 19; distance measurement is carried out with roughly the following procedures.

(1) Prepare three cameras 301, 302, 303, sample characteristic point in an image 304 from the camera 301 which is the reference camera from among those cameras, find the reverse projection 309.

(2) Project the reverse projection 309 on the images 305, 306 from each camera 302, 303 and find candidate corresponding points on those projections 309a, 309b.

(3) Find the reference reverse projections 310 . . . (represented with dotted line) for all candidate corresponding points and find the intersections of these reference reverse projections 310 . . . with the reverse projection 309. From the results, establish the coordinate position of the intersection 308, having many crossings, as the coordinate position of the characteristic point on the article 307.

(4) Execute the aforementioned processing (1)–(3) for all characteristic points on the reference image 304, find the coordinate positions of all candidate points on the article 307, and find the shape of the article 307.

In this way, this technology requires the execution of the complex processing shown in (1)–(3) in sampling a characteristic point on the reference image 304. Moreover, it is necessary to sample and carry out complex processing for all characteristic points on the reference image 304.

For this reason, the calculation time becomes long and this method cannot be used for real time measurement.

Also, camera lens distortion and quantum errors, etc., sometimes result in the intersection 308 of the reverse projection 309 with reference reverse projection 310 not existing. In such a case, the position where each reference reverse projection 310 . . . is closest to the reverse projection 309 must be corrected as the intersection 308. The operation for such a correction greatly lengthens the calculation time.

A paper relating to this technology is "Method for resolving multiple scale, three-dimensional structures by voting from multiple viewpoints using Δ2G filtering" (Journal of the Institute of Electronics, Information and Communications Engineers, D-II, Vol. J78-D-II, No. 3, March 1995).

In the technology described in this paper, space is divided among box cells (boxes) and voting effected in box cells where intersections are present. In this case, the precision of the measurement is adjusted by initially making the divisions into box cells rough and then making the divisions smaller for the box cells having much voting.

However, this technology does not reduce the amount of calculations for calculating intersections, even with rough box cells, and does not shorten the calculation time.

Also, a risk is that, when the number of divisions is increased and detailed measurement carried out for box cells with many intersections, the number of votes for the intersections decreases and the precision of measurement worsens instead.

In this way, the conventional technology, for measuring the distance to and shape of an article from images from a plurality of cameras, has increased calculation time and may not be usable in real time measurement.

Therefore, it is a third object of the third invention of the present invention to constitute the apparatus so as to complete real time measurement and effect calculations in a short period of time, when finding through calculations the distance to and shape of an article from images from a plurality of cameras, with the space to be measured divided into each of the elements.

As discussed above, with the application of the third invention of the present invention to find through calculations the distance to and shape of an article from images from a plurality of cameras, with the space to be measured divided into each of the elements, there may be errors in measurement resulting from the article subject to measurement. That article may be an item with little difference among portions of its surface or with surface characteristics that are difficult to capture: an item with little or no pattern on its surface, or an item with many similar patterns, etc.

It is an object of the fourth invention of the present invention to constitute the apparatus so as to be able to measure the distance to an shape of an article, even an article with surface characteristics that are difficult to capture, precisely and accurately.

As discussed above, with the application of the third invention of the present invention to find through calculations the distance to and shape of an article from images from a plurality of cameras, with the space to be measured divided into each of the elements, a risk is that there may be increases to the operation time and decreased efficiency of measurement with the uniform division of space.

Therefore it is a fifth object of the present invention to improve the efficiency of measurement by changing the number of divisions per uniform area of space to be measured according to the article and circumstances of measurement.

For the aforementioned fourth invention of the present invention, it Is a sixth object to complement the measuring apparatus of the aforementioned fourth invention of the present invention with the addition of a measuring apparatus which can measure portions of an article that are difficult to measure, so as to enable the apparatus to effect measurement of the entire surface of the article.

Also, because of the distance to an article from the measuring apparatus according to the aforementioned third invention, the precision of measurement drops in relation to the distance between a plurality of cameras.

Therefore, it is a seventh object of the present invention to constitute the apparatus so as to be able to sustain the precision of measurement at a prescribed level or better regardless of the distance from the measuring apparatus to the article.

DISCLOSURE OF THE INVENTION

To attain the first object, a first invention of the present invention provides a distance measuring apparatus for measuring a distance from a reference plane to a laser lit position by beaming a laser beam from a laser oscillator to an article and sensing a reflected laser beam, which comprises:

a lens array including a plurality of lenses having identical lens characteristics and disposed at uniform intervals on a plane, the lens array having a hole formed within the plane for allowing passage of the laser beam projected from the laser oscillator;

a photodetector array including a plurality of photodetectors disposed on a plane and corresponding to each lens constituting the lens array, the photodetectors in the photodetector array being disposed at a distance of a focal length of the lens from the lenses in the lens array, the photodetector array having a hole formed within the plane for allowing passage of the laser beam projected from the laser oscillator;

the laser oscillator projecting the laser beam toward the article in such a manner that a direction of the laser beam becomes perpendicular to the photodetector array and the lens array and that the laser beam passes through each of the holes formed in the photodetector array and the lens array;

the lens array, the photodetector array, and the laser oscillator being disposed in front of the article so as to be separated from the article in that order; and calculating means for calculating an effective area on the photodetector array on the basis of an output of each photodetector in the photodetector array, when the laser beam reflected from the article is sensed by the photodetector array via the lens array, and for calculating a distance from the lens array to the article on the basis of the effective area and an angle of view of the lenses constituting the lens array.

The first invention of the present invention can effect distance measurement with good precision even without sufficient calibration. Also, the entire apparatus becomes small and the problem of oversizing can be avoided.

To attain the second object, the second invention of the present invention provides an apparatus which comprises:

an imaging lens array including a plurality of lenses disposed on a plane;

an imaging photodetector array including photodetectors disposed on a plane and having prescribed resolutions corresponding to each lens constituting the imaging lens array, the photodetectors in the photodetector array being disposed at a distance of a focal length of the lens from the corresponding lenses in the lens array;

a reproducing lens array including a plurality of lenses disposed on a plane and having lens characteristics identical to lenses constituting the imaging lens array;

a reproducing emitter array including emitters disposed on a plane and corresponding to each lens constituting the reproducing lens array and having the same size as the photodetectors constituting the imaging photodetector array, the emitters of the emitter array being disposed at a distance of a focal length of the lens from corresponding lenses in the reproducing lens array;

a reproducing sensor array including a plurality of photodetectors disposed on a plane, for sensing light passing through the reproducing lens array;

the imaging lens array, the imaging photodetector array, the reproducing emitter array, the reproducing lens array, and the reproducing sensor array being disposed in front of the article so as to be separated from the article in that order;

transferring means for transferring an output of each photodetector in the imaging photodetector array to each corresponding emitter in the reproducing emitter array and causing emission by the emitters, when the light reflected by the article passes through the imaging lens array and is sensed with the imaging photodetector array;

moving means for moving the reproducing sensor array in a direction of distance measurement for the article, when the light emitted by the reproducing emitter array passes through the reproducing lens array and is sensed with each photodetector of the reproducing sensor array; and calculating means for calculating a distribution of an intensity of light sensed with each photodetector of the reproducing sensor array for each position to which the reproducing sensor array is moved and for calculating a distance to the article from the imaging lens array and a shape of the article on the basis of the light intensity distribution for each position.

The second invention of the present invention can effect distance measurement with an apparatus having a simple configuration even in the case of measuring the distance to the surface of a complex article. Also, the measurement can be completed in a short time without requiring time for calculations, etc.

To attain the third object, the third invention of the present invention provides an apparatus which comprises:

an imaging lens array including a plurality of lenses disposed on a plane;

an imaging sensor array including photodetectors disposed on a plane and having a prescribed resolution and corresponding to each of the lenses constituting the imaging lens array, the photodetectors of the photodetector array being disposed at a distance of a focal length of each lens from corresponding lenses of the imaging lens array; and calculating means for calculating pixels of an imaged image of the photodetectors corresponding to a coordinate position of each element in space on the basis of a positional relationship between the lenses in the imaging lens array and the photodetectors in the imaging photodetector array, for determining coordinate positions representing a profile of the article from among the coordinate positions in the space by comparing image information of the pixels found, and for finding a distance to and a shape of the article on the basis of the coordinate positions determined.

With another mode of the third invention, a plurality of cameras is established in such a manner that the lenses constituting the imaging lens array are the lenses of each camera and the imaged image of the plurality of photodetectors constituting the imaging photodetector array is the imaged image of each camera.

The third invention of the present invention can effect calculations in a short time when finding through calculations the distance to and shape of an article from images from a plurality of cameras, with the space to be measured divided into each of the elements. Thereby measurement can be completed in real time.

To attain the fourth object, the fourth invention of the present invention comprises the following in addition to the construction of the third invention: edge image generating means for generating an edge image for the imaged image, and the calculating means, by using the edge image instead of the imaged image, finds pixels on the edge image corresponding to a coordinate position of each element in space, determines the coordinate position representing a profile of the article from among each coordinate position in the space by comparing image information of the pixels found, only in a case where the pixels found are pixels corresponding to an edge portion in the edge image, and performs calculations to find a distance to and a shape of the article on the basis of the coordinate positions determined.

Another mode of the fourth invention, the apparatus further comprises edge resolving means for generating an edge resolving image wherein pixels corresponding to an edge portion of the edge image and a prescribed number of pixels on a periphery of the edge portion are presumed to be pixels of the edge portion, and the calculating means, by using the edge resolving image instead of the imaged image, finds pixels on the edge resolving image corresponding to a coordinate position of each element in space, determining the coordinate position representing a profile of the article from among the coordinate position of each element in the space by comparing image information of the pixels found, only in a case where the pixels found are pixels corresponding to the edge portion in the edge resolving image, and performs calculations to find a distance to and a shape of the article on the basis of the coordinate positions determined.

The fourth invention of the present invention can measure precisely and accurately the distance to and shape of an article, even an article with surface characteristics that are difficult to capture.

To attain the fifth object, the fifth invention of the present invention comprises the following in addition to the configuration of the third invention: first dividing means for setting a space surrounding the article and for dividing the space into a plurality of elements; in which the calculating means finds pixels in the imaged image corresponding to coordinate positions of each element of the space divided with the first means for dividing, determines coordinate positions representing a profile of the article from among each of the coordinate positions in the space by comparing the image information of the pixels determined, and finds a distance to and a shape of the article on the basis of the determined coordinate positions;

determining means for determining whether the article is present in which area of the space on the basis of results of calculations in progress by the calculating means;

second dividing means for dividing into a further plurality of elements those elements divided by the first dividing means, for an area, in which the article is present, of the space where it is determined that the article is present; and in which the calculating means finds pixels in the imaged image corresponding to coordinate positions of each element of the area where the article is present and which is divided by the second dividing means, determines coordinate positions representing a profile of the article from among each of the coordinate positions of the area where the article is present by comparing the image information of the pixels found, and finds the distance to and the shape of the article on the basis of the coordinate positions determined.

With the application of the third invention of the present invention to find through calculations the distance to and shape of an article from images from a plurality of cameras, with the space to be measured divided into each of the elements, the fifth invention of the present invention determines whether an article is present in any area of the space during calculations, without uniformly dividing space, and increases the number of divisions and performs calculations and measurement for only the areas where it is determined that the article is present; therefore the fifth invention can decrease calculation time and improve the efficiency of measurement.

To attain the sixth object, in addition to the configuration of the fourth invention, the sixth invention of the present invention comprises: a flat portion distance measuring device, other than the distance and shape measuring apparatus, for measuring a distance to a flat portion of a surface of the article, which is disposed for measuring a distance to each position of the surface of the article on the basis of results of measuring the distance to the edge portion of the surface of the article, attained with the distance and shape measuring apparatus, and results of measuring the distance to the flat portion of the surface of the article, attained with the flat portion distance measuring apparatus.

With the measuring apparatus of the fourth invention of the present invention, the sixth invention of the present invention complements the measuring apparatus of the fourth invention with the addition of a measuring device capable of measuring the flat portion of the surface of an article that is difficult to measure, so as to effect measurement of the entire surface of an article.

To attain the seventh object, in addition to the configuration of the third invention, the seventh invention of the present invention is constituted such that: at least two modules, in which the plurality of cameras is disposed so that cameras are separated from each other by a prescribed distance between cameras, are disposed in such a manner that a distance from a camera of one module to a camera of an adjacent module is a distance greater or equal to the prescribed distance between cameras;

plurality of modules are selected from among the two or more modules, so that a distance to one module or between two modules farthest apart becomes less than or equal to the prescribed distance between modules, when a distance from the module to the article is less than or equal to a prescribed distance between module and article;

plurality of modules are selected from among the two or more modules, so that a distance between the two modules farthest apart becomes greater than the prescribed distance between modules, when the distance from the modules to the article is greater than the prescribed distance between module and article; and a distance to and a shape of the article are measured by using the cameras installed in the selected modules.

According to the seventh invention of the present invention, it is possible to sustain the precision of measurement at a prescribed level or better regardless of the distance from the measuring apparatus to the article.

BRIEF DESCRIPTION OF THE DRAWINGS

FIG. 1 is a drawing to show the entire constitution of a first embodiment of the apparatus according to the present invention;

FIG. 2 is a perspective view to explain the positional relationship of the sensor array and lens array shown in FIG. 1;

FIG. 3 (a) is a perspective view to show the area through which light passes of the lens array shown in FIG. 1 and, FIG. 3 (b) is a diagram to explain the geometrical relationship of the lens array and article;

FIG. 4 is a drawing to show the entire constitution of a second embodiment of the apparatus according to the present invention;

FIG. 5 is a perspective view to explain the positional relationship of the sensor array and lens array shown in FIG. 4;

FIG. 6 (a) is a perspective view to show the area through which light passes of the lens array shown in FIG. 4 and, FIG. 6 (b) is a diagram to explain the geometrical relationship of the lens array and article;

FIGS. 20 through 27 are drawings used to explain a seventh embodiment;

BEST MODE FOR CARRYING OUT THE INVENTION

Figure 7:
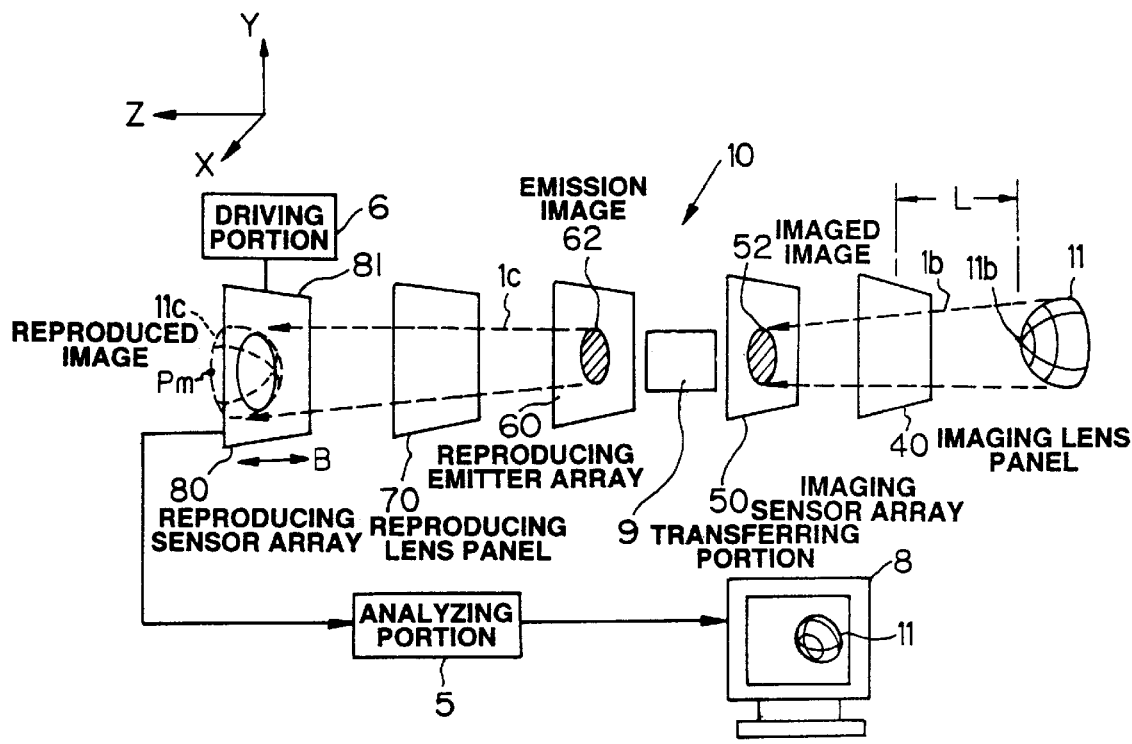
FIG. 7 is a drawing to show the entire constitution of a third embodiment of the apparatus according to the present invention.

Below embodiments of out the present invention are explained with reference to the drawings.

First Embodiment

FIG. 1 shows the constitution of a distance measuring apparatus 10 which is an embodiment for attaining the first object of the present invention.

As shown in the figure, the lens panel 20 which is a lens array, a sensor array 30 which is a photodetector array, and a laser oscillator 1 are established in front of the article 11, subject to measurement, so as to be separated from the article 11 in that order.

In the lens panel 20, a plurality of lenses 21 having identical lens characteristics, essentially having the same properties such as angle of view, focal length, and lens diameter, are arranged regularly and separated uniformly on a plane as shown in FIG. 2. A hole 22, to allow passage of the laser beam 1a oscillated and beamed from the laser oscillator 1, is placed in the center of this lens panel 20.

In the sensor array 30, a plurality of photodetectors 31 corresponding to each lens 21 constituting the aforementioned lens panel 20 are arranged on a plane as shown in FIG. 2. One or a plurality of the photodetectors 31 corresponds to each lens 21. However, one CCD element having a uniform resolution need not correspond to one lens 21. The intensity of light (brightness) detected by each photodetector 31 is stored and that stored intensity is output to the analyzing portion 5.

The photodetectors 31 constituting the sensor array 30 are established at a distance of the focal length of the pertinent lens 21 from the lenses 21 in the lens panel 20. Also a hole 32, to allow passage of the laser beam 1a oscillated and beamed from the laser oscillator 1, is placed in the center of the sensor array 30, as in the lens panel 20.

The laser oscillator 1 oscillates and beams a laser beam 1a with a specific wavelength toward the article 11 and sending the laser beam 1a to one point 11a on the article 11. The positional relationship of the laser oscillator 1 is such that the direction in which it beams the laser becomes perpendicular to the sensor array 30 and the lens panel 20 and the laser beam 1a passes through each of the holes 32, 22 established in the sensor array 30 and the lens panel 20.

When the laser oscillator 1 starts, the laser beam 1a is sent toward the article 11 by laser oscillation. Then, the laser beam 1a which passed through the holes 32, 22 is reflected and scattered by the point 11a on the article 11. This reflected laser beam 1b scattered by the article 11 passes through the lens panel 20 as represented with the dotted line.

At this time, the reflected light 1b passes through only the lenses 21 . . . present in the shaded area Ar in FIG. 3(a), from among the lenses 21 . . . constituting the lens panel 20. Then, in the sensor array 30 via this lens panel 20, the reflected light 1b is detected with the photodetectors 31 present in the area of a size in accord with the aforementioned lit area Ar and an image 33 is generated.

The output of each photodetector 31 of the sensor array 30 is input to an analyzing portion 5 and the distance from the surface of the lens panel 20 to the article 11 (lit position 11a on article 11) is calculated as shown below.

Specifically the group of photodetectors which detected light of an intensity equal to or greater than a prescribed threshold value is found on the basis of the output of each photodetector 31. Then the radius R of the lens group corresponding to the group of photodetectors at the intensity greater than or equal to this threshold value, in effect the lit area Ar, is calculated (see FIG. 3(a)). In FIG. 3, $P_A$ is the profile position of the lit area Ar, in effect the position farthest from the center of the area Ar.

This radius R is found with any of the following methods.

(1) Find the radius R from the difference between the coordinate position of the lens 21 corresponding to the center of the lit area Ar and the coordinate position of the lens 21 corresponding to the profile position $P_A$ of the lit area Ar.

(2) Count the number of lenses 21 present in the lit area Ar and find the radius R as a value with respect to that count n. For example, find the radius R with equation (1) below.

$$R=(n)^{1/2} r \qquad (1)$$

In the formula, r is a representative radius per lens 1. Moreover, ()½ is defined as raising to the power of ½.

Next, as clear from the geometrical relationship in FIG. 3(b), the distance L between the surface of the lens panel 20 and the lit position 11a on the article 11 is calculated with the following equation (2) on the basis of the calculated radius R and the angle of view θ of the lens 21.

$$L=R/\tan(\theta/2) \qquad (2)$$

Moreover, when r is the radius of the lens 21 and f is the focal length of the lens 21, the following relationship is established.

$$\tan(\theta/2)=r/f$$

Therefore, this is substituted in equation (2) and the distance L may be found with the following equation.

$$L=R f/r \qquad (2)$$

Once the distance L is calculated in the analyzing portion 5 in this way, the results of the calculation are output to an external output apparatus (display, printer).

Moreover the apparatus shown in FIG. 1 is constituted so that the laser beam 1a is sent from the laser oscillator 1 in a direction where it passes through the holes 32, 22 in the sensor array 30 and lens panel 20; but this need be such that the reflected laser beam 1b passes through the lens panel 20 and an image 33 is generated with the sensor array 30. Consequently, so long as that is possible, the laser beam 1a may be beamed directly toward the article 11 from the laser oscillator 1 established at an arbitrary location without passing through the sensor array 30 and lens panel 20. In this case the arrangement of the holes 32, 22 can be omitted.

In this way, distance can be measured with simple processing as well as a small apparatus with the apparatus 10 shown in FIG. 1.

Moreover calibration is simple to perform since the laser oscillator 1 need only be set so that the laser beam is sent in a direction perpendicular to the surface of the lens panel 20. Also, the calibration relating to the lenses becomes unnecessary. Also, precision of the sensor array becomes unnecessary.

Moreover the size, number, and angle of view, etc., of the lenses 21 in the lens panel 20 influence the precision of distance measurement; therefore the measuring precision can be improved by increasing the number of lenses, etc. The number of lenses may also be decreased; the cost of the apparatus can be decreased in this case.

Second Embodiment

This second embodiment also has the purpose of achieving the first object of the present invention.

When measuring the distance to an article 11 having a large area to be measured with the apparatus shown in FIG. 1, it becomes necessary to enlarge the lens panel 20 or install a mechanism to scan the lens panel 20 so that the measured area of the article 11 is positioned in front of the lens panel 20.

FIG. 4 shows an apparatus 10 which can measure the distance to an article 11 having a large area to be measured with an apparatus having a simple constitution, without installing such a scanning mechanism or increasing the size of the entire apparatus.

As shown in this figure, a lens panel 20' which is the lens array and a sensor array 30' which is the photodetector array are established in front of the article 11, subject to distance measurement, so as to be separated from the article 11 in that order. The lens panel 20' and sensor array 30' have a spherical form and are established so that the interior of the lens panel 20' faces the exterior of the sensor array 30'.

The laser oscillator 1 oscillates and sends the laser beam 1a with a specific frequency toward the article 11 and to one point 11a on the article 11. Unlike the apparatus 10 in FIG. 1, the laser oscillator 1 is established at a position where the laser beam 1a is shone directly on the article 11 without passing through the sensor array 30' and the lens panel 20'.

As shown in FIG. 5, a plurality of lenses 21 having identical lens characteristics, essentially having the same properties such as angle of view, focal length, and lens diameter, are arranged regularly and separated uniformly on a sphere in the lens panel 20'.

As shown in FIG. 5, a plurality of photodetectors 31 corresponding to each lens 21 constituting the aforementioned lens panel 20' are arranged on a sphere in the sensor array 30'. One or a plurality of the photodetectors 31 corresponds to each lens 21. However, one CCD element having a uniform resolution need not correspond to one lens 21. The intensity of light detected by each photodetector 31 is stored and that stored intensity is output to the analyzing portion 5.

The photodetectors 31 constituting the sensor array 30' are established at a distance of the focal length of the pertinent lens 21 from the lenses 21 in the lens panel 20'.

When the laser oscillator 1 starts, the laser beam 1a is beamed toward the article 11 by laser oscillation. Then, the laser beam 1a is reflected and scattered by the point 11a on the article 11. Scattered by the article 11, this reflected laser beam 1b passes through the lens panel 20' as represented with the dotted line.

At this time, the reflected light 1b passes through only the lenses 21 present in the shaded area Ar in FIG. 6(a), from among the lenses 21 constituting the lens panel 20'. Then, in the sensor array 30' via this lens panel 20', the reflected light 1b is detected with the photodetectors 31 present in the area of a size in accord with the aforementioned lit area Ar and an image 33 is generated.

The output of each photodetector 31 of the sensor array 30' is input to an analyzing portion 5 and the distance from the surface of the lens panel 20' to the article 11 (lit position 11a on article 11) is calculated as shown below.

Specifically the group of photodetectors which detected light of an intensity greater than or equal to a prescribed threshold value is found on the basis of the output of each photodetector 31. Then the radius R of the lens group corresponding to the group of photodetectors at the intensity greater than or equal to this threshold value, in effect the lit area Ar, is calculated (see FIG. 6(a)).

This radius R is found with any of the following methods.

(1) Find the difference between the coordinate positions of the lenses 21 at the two most separated positions in the lit area Ar and find the radius R with that difference as the diameter D of the lit area Ar.

(2) Count the number of lenses 21 present in the lit area Ar and find the radius R as a value corresponding to that count n. For example, the radius R can be found with the equation (1) discussed above.

Next, as clear from the geometrical relationship in FIG. 6(b), the distance L between the reference surface 23 of the lens panel 20' and the lit position 11a on the article 11 is calculated with the following equation (3) on the basis of the calculated radius R, the angle of view θ of the lens 21, and the spherical radius R0 of the lens panel 20'. Moreover, $P_A$ in FIG. 6 is the profile position of the lit area Ar, in effect the position farthest from the center of the area Ar.

$$L = R/\tan(\theta/2 - \arcsin(R/R0)) \quad (3)$$

Moreover, when r is the radius of the lens 21 and f is the focal length of the lens 21, the following relationship is established.

$$\tan(\theta/2) = r/f$$

Therefore, this becomes $$\theta/2 = \arctan(r/f)$$

and when substituted in equation (3), the distance L may be found with the following equation.

$$L = R/\tan(\arctan(r/f) - \arcsin(R/R0)) \quad (3')$$

Also the direction of the article 11 (lit position 11a) is calculated with the analyzing portion 5.

Specifically, the coordinate position of the center of the spherical surface of the sensor array 30' is represented by P0 (x0, y0, z0) and the coordinate position of the center of the sensing area 33 of the sensor array 30' is represented by P1 (x1, y1, z1); the vector V connecting those points is found with the following.

$$V = (x1-x0, y1-y0, z1-z0) \quad (4)$$

The coordinate position of the spherical center of the lens panel 20' is represented by P'0 and the coordinate position of the center of the lit area Ar on the lens panel 20' is P'1; so the vector V linking those points may also be found from those points (see FIG. 6(a)).

The distance L and direction V are calculated in the analyzing portion 5 in this way; whereupon the results of the calculation are output to an external output apparatus (display, printer). With the apparatus 10 shown in FIG. 4 as discussed above, it is possible to measure distance with simple processing as well as a small apparatus.

Moreover, the precision of the sensor array and calibration relating to lenses become unnecessary. Furthermore, the apparatus 10 shown in FIG. 4 can measure an article 11 with a large area to be measured with an apparatus having a simple constitution, without the installation of a scanning mechanism or increase in size of the entire apparatus, so long as the subject of distance measurement is present in the normal direction of the spherical surface of the lens panel 20'.

Moreover the size, number, and angle of view, etc., of the lenses 21 in the lens panel 20' influence the precision of distance measurement; therefore the measuring precision can be improved by increasing the number of lenses, etc. The number of lenses may also be decreased and the lens size increased where rough precision is sufficient; the cost of the apparatus can be decreased in this case.

Third Embodiment

This third embodiment has the purpose of achieving the second object of the present invention.

The first and second embodiments discussed above are applied in the case of measuring the distance to one point on an article 11. An apparatus able to measure the distance to a plurality of points on an article 11 at the same time, and consequently able to measure the shape of the article 11 at the same time, is explained below.

The apparatus 10 shown in FIG. 7 is an apparatus to measure the distance to and shape of (coordinate position of profile) an article 11 by optically attaining a reproduced image of the article 11.

Specifically, as shown in this figure, an imaging lens panel 40 which is the imaging lens array, an imaging sensor array 50 which is the imaging photodetector array, a reproducing emitting array 60 which is the reproducing emitter group array, a reproducing lens panel 70 which is the reproducing lens array, and a reproducing sensor array 80 are established in front of the article 11, subject to distance measurement, so as to be separated from the article 11 in that order.

Figures 8A, 8B:
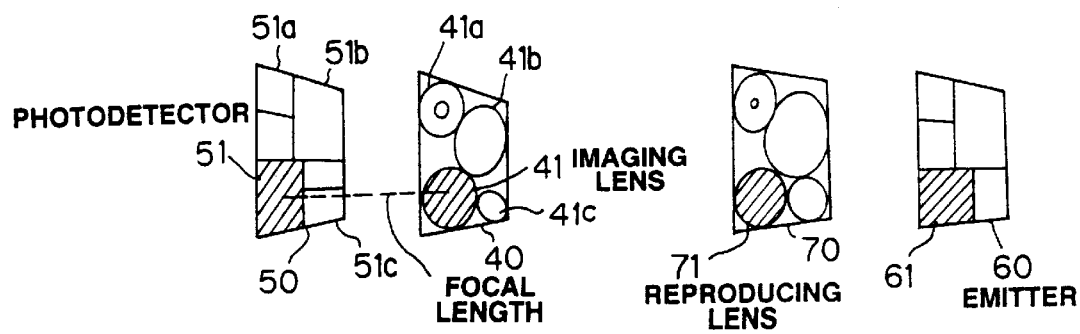
FIGS. 8 (a) and 8(b) are inclined views to explain the positional relationship of the sensor array and lens array shown in FIG. 7.

The imaging lens panel 40 has a plurality of lenses 41 established on a plane as shown in FIG. 8(a). Moreover the lenses 41 may be established on a spherical surface instead of a plane. The lens characteristics (angle of view, focal length, lens diameter) of each of the lenses 41 need not be identical and each lens may have different lens characteristics. The intervals at which the lenses 41 are established need not be uniform and regular intervals and may be irregular.

The imaging sensor array 50 has photodetectors 51 corresponding to each of the lenses 41, constituting the aforementioned imaging lens panel 40, established on a plane as shown in FIG. 8(a). One photodetector 51 corresponds to one lens 41 and photodetectors (for example CCD elements) having uniform resolution are used. The photodetectors 51 constituting the imaging sensor array 50 are established at a distance of the focal length of each lens 41 from the lenses 41 constituting the imaging lens panel 40.

When light is detected with the photodetectors 51, the brightness (intensity) on the photodetectors 51 is stored and retained. Moreover, it is desirable that the hue (color) be stored as well as brightness.

The reproducing lens panel 70 is a lens panel having the exact same constitution as the imaging lens panel 40 as shown in FIG. 8(b); the lenses 71 having the same lens characteristics as the lenses 41 are established on the surface in the same arrangement as in the imaging lens panel 40.

The reproducing emitter array 60 also is an emitter array having exactly the same constitution as the imaging sensor array 50 as shown in FIG. 8(b); emitters 61 having the same size and same resolution as the photodetectors 51 are established on the surface in the same arrangement as in the imaging sensor array 50. Each of the emitters 61 in the reproducing emitter array 60 corresponds to each lens 71 in the reproducing lens panel 70; an image identical to the image attained with each of the photodetectors 51 constituting the imaging sensor array 50 is captured with each emitter 61. The emitters 61 constituting the reproducing emitter array 60 are established at a distance of the focal length of each lens 71 from the lenses 71 constituting the reproducing lens panel 70.

Also, a plurality of photodetectors 81 are installed on the surface of the reproducing sensor array 80. The light passing through the reproducing lens panel 70 is detected and a reproduced image 11c of the article 11 is captured with this plurality of photodetectors 81. The photodetectors 81 output the detected data, such as brightness and hue, to the analyzing portion 5.

A transferring portion 9 is provided between the imaging sensor array 50 and the reproducing emitter array 60, for transferring the received data such as the brightness of each pixel of each photodetector 51 in the imaging sensor array 50 to each pixel of each corresponding emitter 61 in the reproducing emitter array 60.

Furthermore a driving portion 6, causing the reproducing sensor array 80 to move in the direction of distance measurement B of the article 11, is installed on the reproducing sensor array 80.

Figure 9:
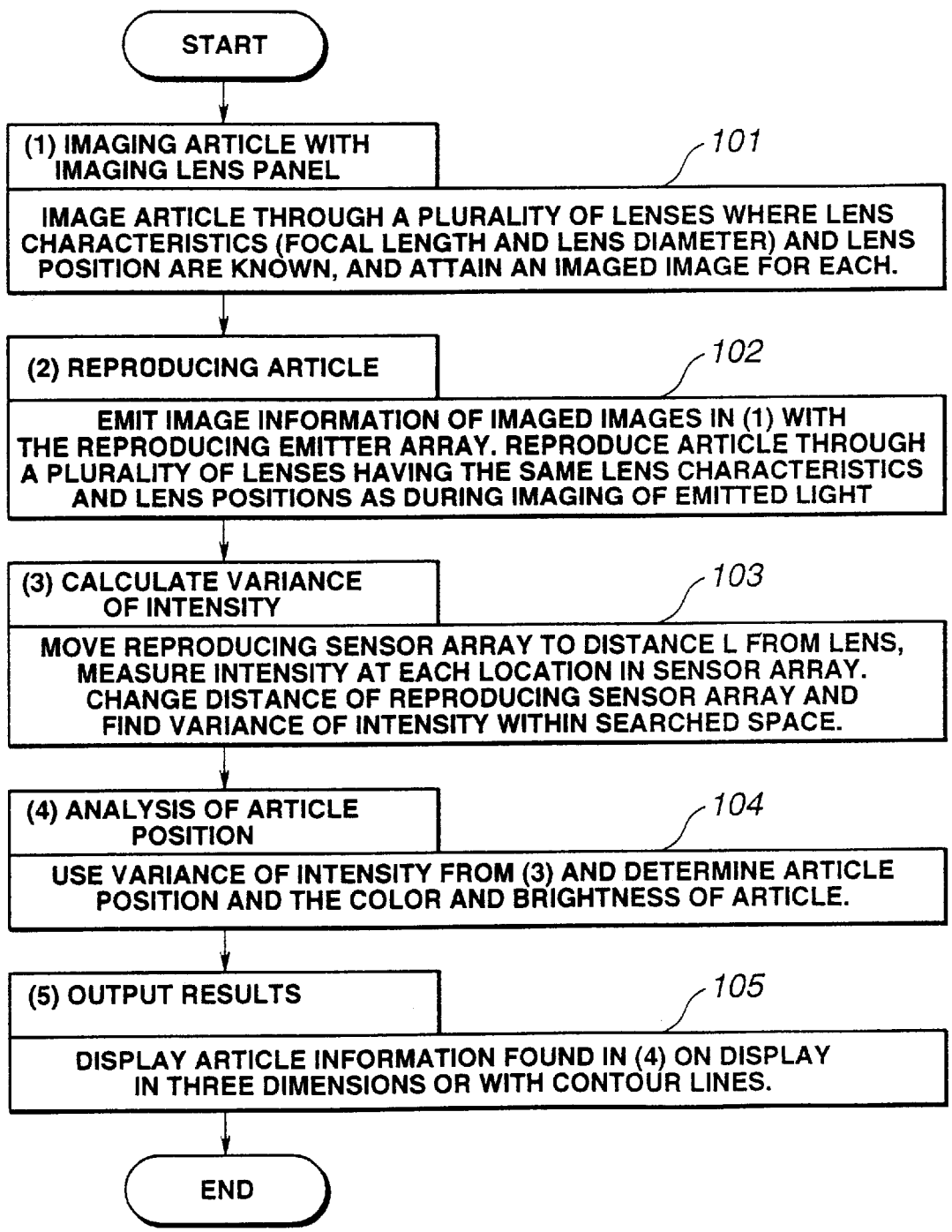
FIG. 9 is a flow chart to show the procedure for measurement processing effected with the apparatus shown in FIG. 7.

Next, the processing to measure the distance to and shape of the article 11 is explained with reference to the flow chart in FIG. 9.

When the reflected light 1b (shown with the dotted line) from the article 11 passes through the imaging lens panel 40, that passing light 1b is detected with the imaging sensor array 50 and the imaged image 52 is generated (Step 101).

The detected data such as the brightness of each pixel of each photodetector 51 of the imaging sensor array 50 is transferred to each corresponding pixel of each emitter 61 in the reproducing emitter array 60 by the transferring portion 9 and each emitter 61 effects emission. As a result the emitted image 62, which is the same as the imaged image 52 of the imaging sensor array 50, is generated in the reproducing emitter array 60.

The light 1c from the emitted image 62 of the reproducing emitter array 60 passes through the reproducing lens panel 70 and is detected with the reproducing sensor array 80 (Step 102).

Next the reproducing sensor array 80 is moved gradually by the driving portion 6 in the direction B of measuring distance L to the article 11.

Here this X-Y-Z coordinate system is established so that the direction of the Z axis becomes the same as the direction B in which the sensor array 80 moves. Each position on the Z axis is $z_i$ (i=0, 1, 2 n1); likewise each position on the X and Y axes are $x_j$, $y_k$ (j=0, 1, 2 n2; k=0, 1, 2 n3). Then one photodetector 81 corresponds to one point $P_{jk}$ ($x_j$, $y_k$) on the reproducing sensor array 80.

Whereupon the detected data of the photodetector 81 present at each position $P_{jk}$ ($x_j$, $y_k$) on the reproducing sensor array 80 for each movement position $z_i$ on the Z axis is input in sequence to the analyzing portion 5. The variance of intensity (variance of brightness, variance of amount of detected light) on the sensor array 80 is attained for each movement position $z_i$ (Step 103).

The coordinate position Pm representing the profile (reproduced image 11c) of the article 11 is found as follows.

(1) Initial setting to j=0, k=0.

(2) Compare intensity of coordinate position $P_{jk}$ ($x_j$, $y_k$) for each movement position z0-zn1 and find the Z axis position zm where intensity is greatest. That position found is Pm ($x_j$, $y_k$, zm).

(3) Incrementize j, k, and repeat step (2).

The shape of the article 11 is established by connecting through interpolation, etc., each of the coordinate positions Pm attained in this way. Also once each coordinate position Pm on the profile of the article 11 is known, the distance L from each position on the article 11 to the imaging lens panel 40 can be found.

Furthermore the color of the surface of the article 11 can be determined on the basis of the hue data of the photodetector 81 corresponding to the profile coordinate position Pm of the article 11 (Step 104). The results of analysis by the analyzing portion 5 are output to the display 8 and the article 11 is represented in three dimensions on a screen. In this case, the article 11 may be represented with contour lines added to the three-dimensional image (Step 105).

Figure 10:
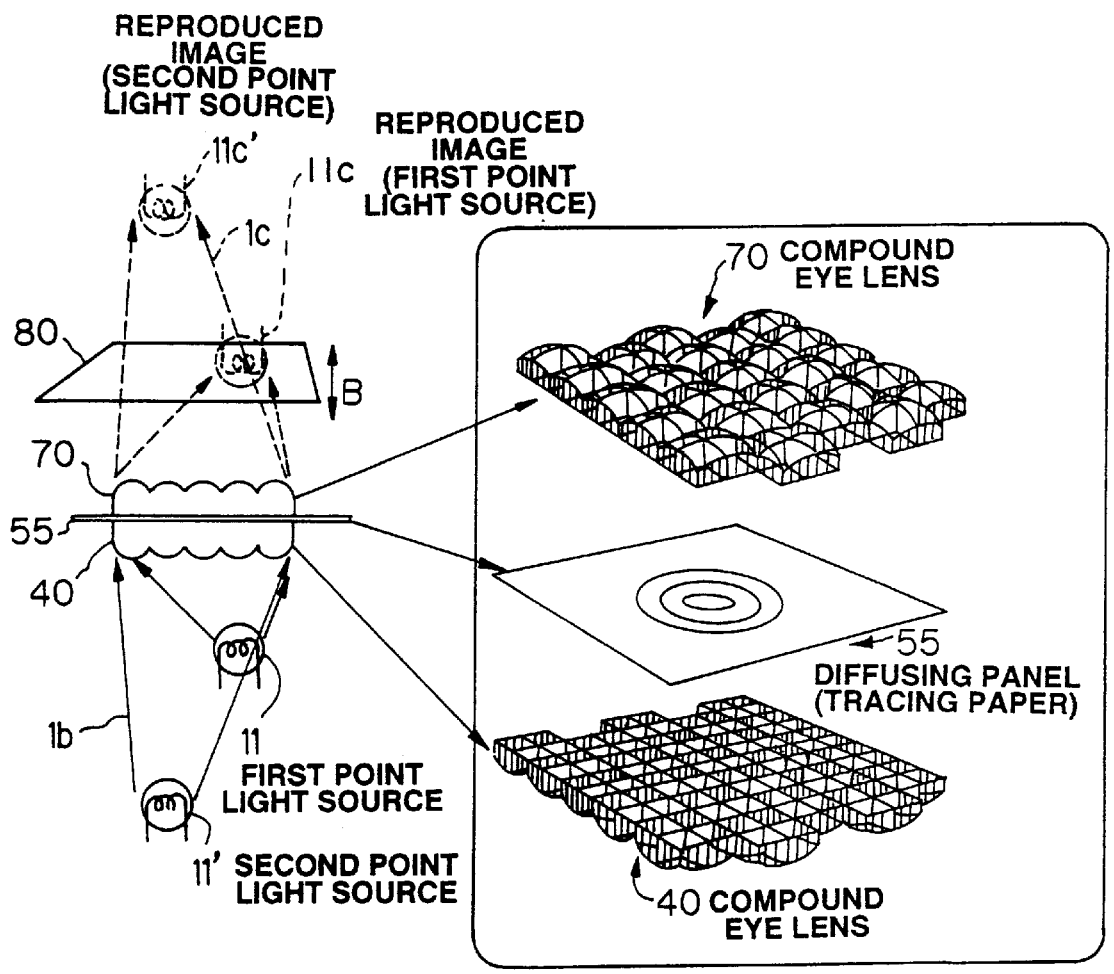
FIG. 10 is a drawing to explain a different example of the apparatus shown in FIG. 7.

A transferring portion 9, to transfer the detected data of the sensor array 50 to the emitter array 60, may be installed in the apparatus 10 shown in FIG. 7, along with the imaging sensor array 50 and reproducing emitter array 60. However, as shown in FIG. 10, the constitution of the apparatus may be further simplified by omitting the transferring portion 9 and combining the imaging sensor array 50 and the reproducing emitter array 60.

Specifically as shown in this figure, a semitransparent diffusing panel 55 (tracing paper can be used, for example), having the functions of the imaging sensor array 50 and the reproducing emitter array 60, is established so as to be held between a compound eye lens 40, being the imaging lens panel, and a compound eye lens 70, being the reproducing lens panel.

The light 1b of the first point light source 11 and second point light source 11', subject to measurement, passes through the compound eye lens 40 and radiates the diffusing panel 55; the image of the first point light source 11 and second point light source 11' is copied to that surface.

The image copied to the surface of the diffusing panel 55 is copied to the back surface of the diffusing panel 55, because the diffusing panel 55 is semitransparent. The light 1c from the image copied to the back surface of the diffusing panel 55 passes through the compound eye lens 70 and is formed as the reproduced images 11c, 11'c of the first point light source 11 and second point light source 11'. The profile position of the reproduced images 11c, 11'c is captured in the same way as with the apparatus 10 shown in FIG. 7 by the movement of the scattering panel 80 (tracing paper can be used, for example) which is the reproducing sensor array.

Moreover the diffusing panel 55 can also be constituted with any materials so long as it is a panel which can send out the light radiating one surface, without alteration, from the other surface.

As above, this third embodiment can complete measurement in a short period of time without requiring time for calculations, etc., and can effect distance measurement with a device having a simple constitution, even when measuring the distance to an article with a complex surface.

Regarding this issue, the prior art (active stereo method) is basically a technique to measure the distance to one point; it is problematic in that, the apparatus is made complex in order to measure the distance to an article with a complex surface and a great amount of time is taken up for scanning the laser beam and calculating the distance. This is improved with the third embodiment.

However, with the third embodiment, the size of the entire apparatus 10 becomes larger for a larger article 11 which is subject to measurement, because the article 11 is made the same size as the original.

Next an embodiment for an apparatus 10, which is not enlarged even for a large subject of measurement, is explained.

Fourth Embodiment

With the fourth embodiment, the size of the emitter 61 in the reproducing emitter array 60 shown in FIG. 7 is made a size analogous to the photodetector 51 of the imaging sensor array 50 reduced by a prescribed reduction ratio (for example 50%).

Likewise, the size of the lens 71 of the reproducing lens panel 70 is made a size analogous to the lens 41 in the imaging lens panel 40 reduced by the aforementioned reduction ratio.

Then, means for transferring 9 is constituted to transfer the output of each photodetector 51 on the imaging sensor array 50 to each corresponding emitter 61 on the reproducing emitter array 60, so that the imaged image 52 of the imaging sensor array 50 is reduced by the aforementioned reduction ratio and displayed as the emitted image 62 on the reproducing emitter array 60.

As a result, a reproduced image 11c, reduced by the aforementioned reduction ratio and analogous to the original article 11, is attained with the reproducing sensor array 80.

A reproduced image 11c smaller than the original article 11 (for example, an image of half the size) is attained with this fourth embodiment as above. Therefore the problem of oversizing can be avoided with this fourth embodiment because it becomes unnecessary to increase the size of the entire apparatus, even when reproducing a large article 11.

Fifth Embodiment

Figure 12:
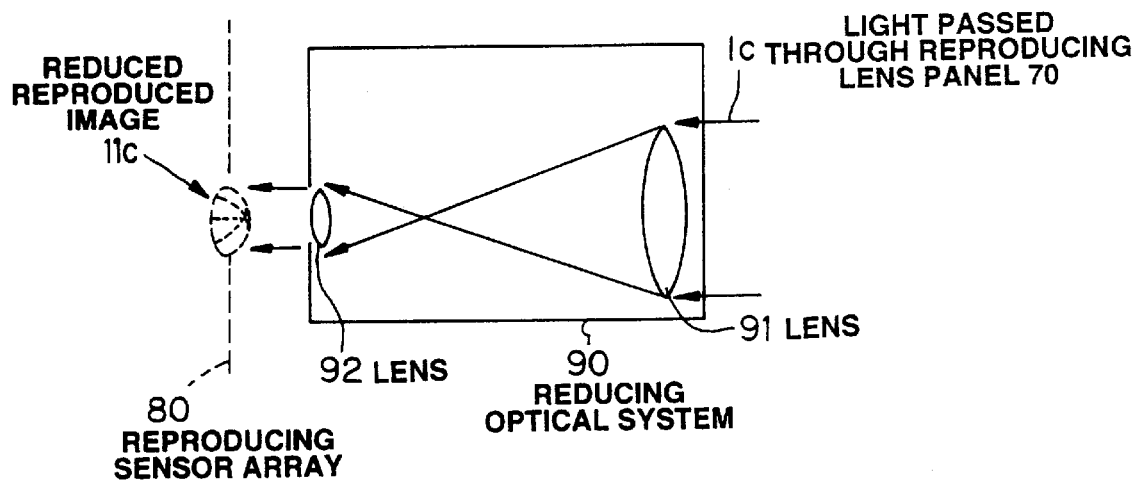
FIG. 12 is a drawing to show a reducing optical system used in a fifth embodiment of the apparatus according to the present invention.

As shown in FIG. 12, the arrangement may be such that a reducing optical system 90, which reduces a reproduced image 11c of the article 11 reproduced with a reproducing sensor array 80 by a prescribed reduction ratio (for example 50%), is installed between the reproducing lens panel 70 and the reproducing sensor array 80, so as to capture the reproduced image 11c smaller than the original article 11 (for example, an image of half the size).

This reducing optical system 90 comprises a lens 91 installed on the side of the reproducing lens panel 70 and a lens 92 installed on the side of the reproducing sensor array 80, and is constituted so that the light 1c passing through the reproducing lens panel 70 via the lenses 91 and 92 is detected with the reproducing sensor array 80 and a reduced reproduced image 11c is generated.

When the focal length of the lens 91 is f1 and the focal length of the lens 92 is f2, the reduction factor G is determined with equation (5) below.

$$G = f2/f1 \tag{5}$$

As above, a reproduced image 11c which is smaller than the original article 11 (for example, an image of half the size) is attained with this fifth embodiment; therefore, the problem of oversizing can be avoided with this fifth embodiment because it becomes unnecessary to increase the size of the entire apparatus, even when reproducing a large article 11.

Sixth Embodiment

This sixth embodiment is the embodiment to achieve the third object of the present invention.

Figure 11:
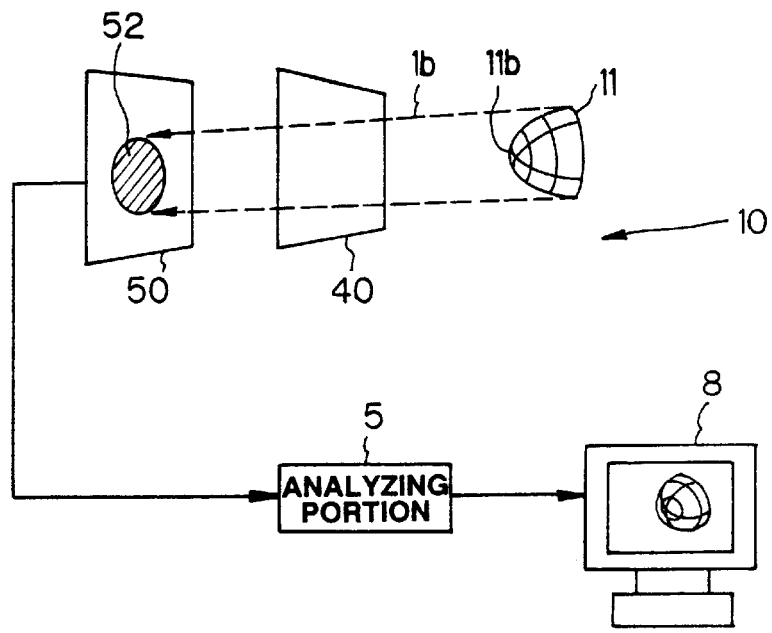
FIG. 11 is a drawing to show the entire constitution of a sixth embodiment of the apparatus according to the present invention.

FIG. 11 shows an apparatus 10 of the present embodiment wherein the imaging lens panel 40 and imaging sensor array 50 are unchanged and the reproducing emitter array 60, reproducing lens panel 70, reproducing sensor array 80, transferring portion 9, and driving portion 6 are omitted from the apparatus 10 shown in FIG. 7; and which directly takes up the output of the imaging sensor array 50 into the analyzing portion 5 and finds the reproduced image 11c of the article 11 through calculation.

In this case, the constitution of the apparatus in FIG. 11 may have a plurality of cameras installed instead of the imaging lens panel 40 and imaging sensor array 50, so that the imaging results of those cameras are taken up in the analyzing portion 5.

Specifically, this is because, as shown in FIG. 8(a), the lenses 41a, 41b, 41c constituting the imaging lens panel 40 are presumed to be the lens of each camera; and the imaged images 51a, 51b, 51c of the photodetectors constituting the imaging sensor array 50 are presumed to be the imaged images imaged by each camera 41a, 41b, 41c.

Figure 13:
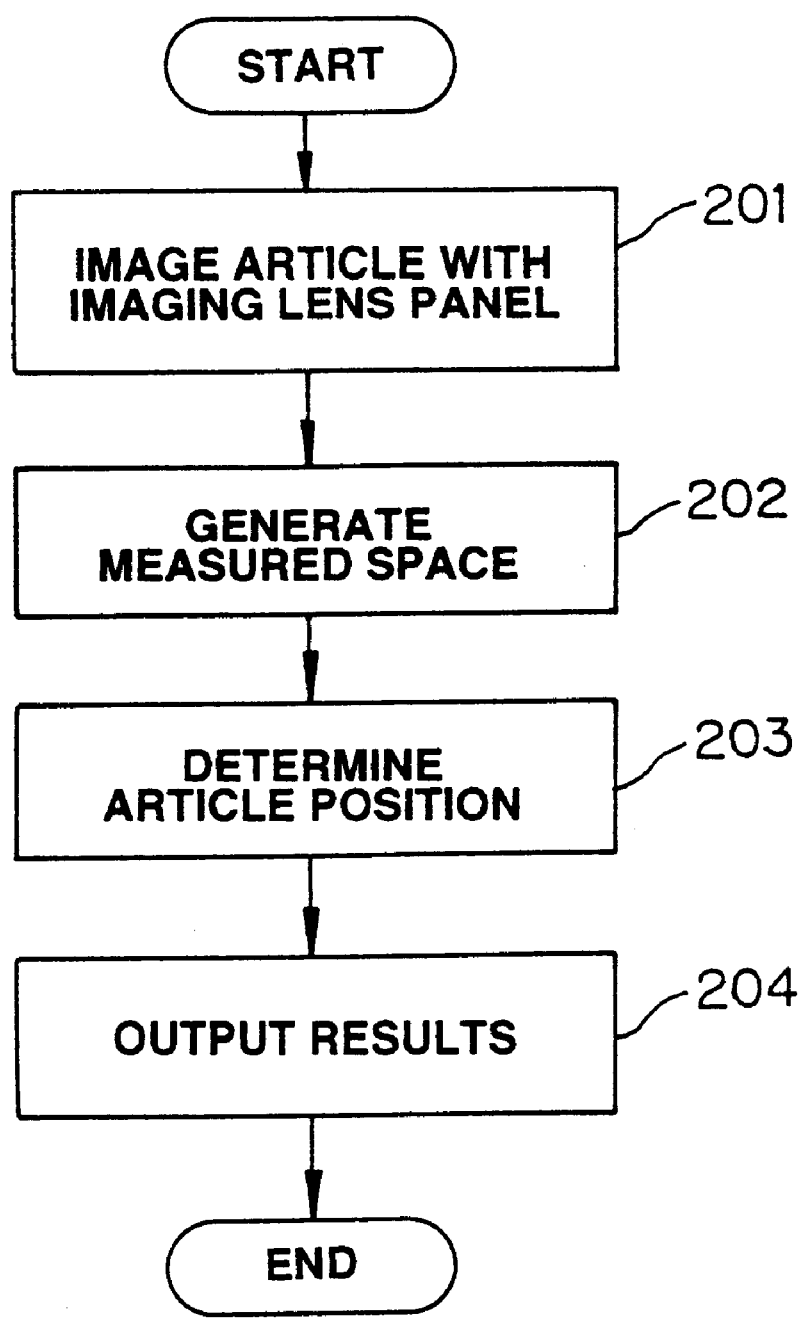
FIG. 13 is a flow chart to show the procedure for measurement processing effected with the apparatus shown in FIG. 11.
Figure 14:
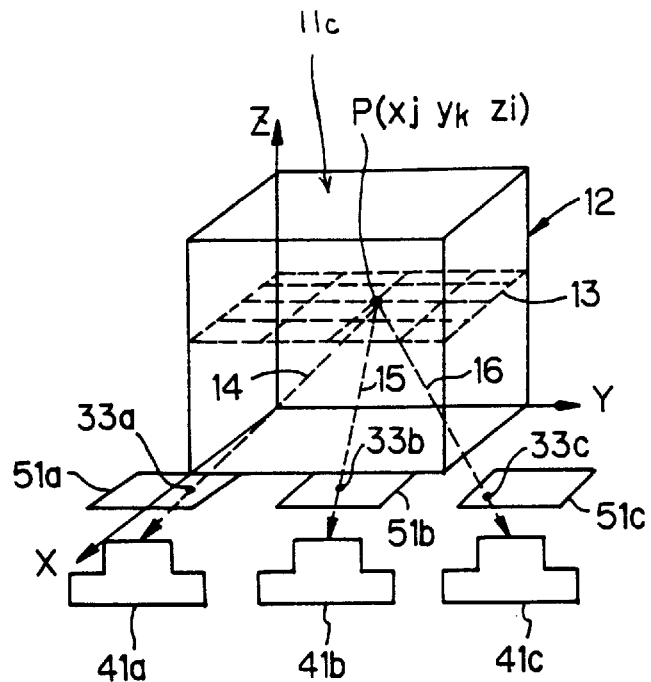
FIG. 14 is a drawing to explain the calculation processing effected with the sixth embodiment.

Accordingly, as shown in FIG. 14, the processing of imaging the article 11 with each camera 41a, 41b, 41c, finding the reproduced image 11c of the article 11 on the basis of those imaged images 51a, 51b, 51c and measuring the distance to and shape of the article 11, is explained below with reference to the flow chart in FIG. 13.

The reflected light 1b (shown with the dotted line) from the article 11 radiates to each lens of the cameras 41a, 41b, 41c, whereupon the imaged images 51a, 51b, 51c are captured (Step 201).

The data (brightness (intensity), hue) detected for each pixel constituting the imaged images 51a, 51b, 51c are input to the analyzing portion 5.

Generation of measured space (Step 202)

As shown in FIG. 14, the X-Y-Z coordinate system is established so that the direction of the Z axis Is the same as the direction of distance measurement. Each position on the Z axis is zi (i=0, 1, 2 n1); likewise each position on the X and Y axes are xj, yk (j=0, 1, 2 n2; k=0, 1, 2 n3).

The position of each camera is known in advance; therefore, the coordinate position of the center of each lens 41a, 41b, 41c and the coordinate position of each imaged image 51a, 51b, 51c can be specified on the X-Y-Z coordinate system (see FIG. 14).

In the X-Y-Z coordinate system, the cubic measured space 12 is established at the location where the article 11 is considered to be. Then this measured space 12 is divided into cross sections perpendicular to the Z axis; there is a cross section 13, 13 for each position zi on the Z axis. Furthermore, the cross section 13 is divided in the shape of a mesh among a plurality of elements.

The coordinate position (mesh crossing position) of each element in the cross section 13 at a Z axis position zi attained in this way is P (xj, yk, zi).

Figure 15:
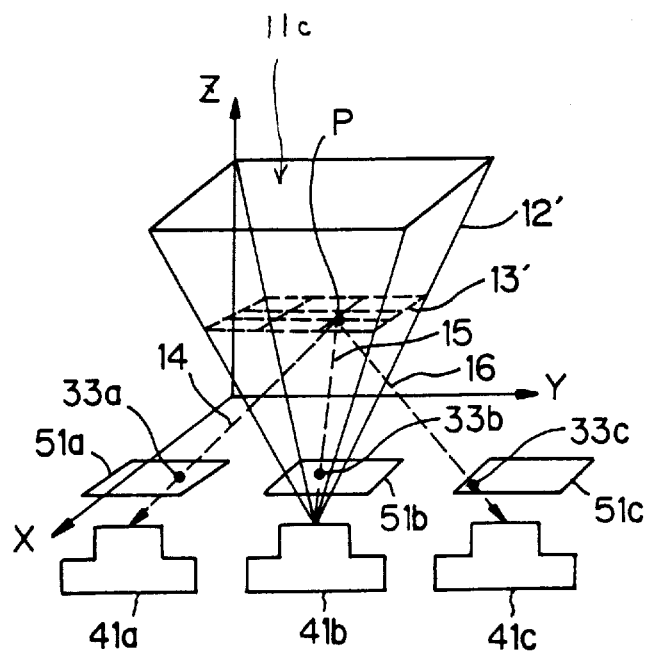
FIG. 15 is a drawing to explain the calculation processing effected with the sixth embodiment.

As shown in FIG. 15, the camera (41b) to be the standard among the cameras 41a, 41b, 41c may be established; and the measured space 12', in the shape of a four-sided cone the apex of which is the center of the lens of this camera, may be established. In this case as well, the mesh crossing position P (xj, yk, zi) of each element at the cross section 13' of the Z axis position zi is likewise established.

Determining article position (Step 203)

The coordinate position Pm showing the profile of the article 11 is found as follows.

Basically, the idea is that the intersection P corresponding to the profile of the article 11 will be determined assuming that "for each mesh intersection P, the pixel in the image 51a–51c of each corresponding camera 41a–41c is the same or similar detected data (brightness, hue), if that is the profile of the article 11."

The following two methods are calculating methods to determine the profile position P.

Method for finding average value of intensity

With this method, the intersection P corresponding to the profile of the article 11 is determined with the following procedures.

(1) Initial setting to j=0, k=0.

(2) Draw lines 14, 15, 16 to the center positions of the lenses 41a, 41b, 41c of each camera with the mesh intersection Pjk (xj, yk) as the starting point, find the positions where these lines 14, 15, 16 intersect each of the imaged images 51a, 51b, 51c, and determine the pixels 33a, 33b, 33c corresponding to those intersection positions (see FIG. 14). Then find the average value of the intensity (brightness) of these pixels 33a, 33b, 33c. Perform the processing to find this average value of intensity for the same mesh intersection Pjk (xj, yk) on the cross sections 13 at each Z axis position z0-zn. Then compare the average values of intensity for each Z axis position z0-zn and find the Z axis position zm where intensity is greatest. Make the position found Pm (xj, yk, zm).

(3) Incrementize J, k, and repeat step (2).

The shape of the article 11 is established by connecting through interpolation, etc., each of the coordinate positions Pm attained in this way. Also once each coordinate position Pm on the profile of the article 11 is known, the distance L from each position on the article 11 to each camera 41a, 41b, 41c can be found.

Furthermore the color of the surface of the article 11 can be determined on the basis of the hue data of the detected pixels 33a14 33c corresponding to the profile coordinate position Pm of the article 11.

Method for finding variance

With this method, the point P representing the profile of the article 11 is determined with the following procedures.

(1) Initial setting to i=0 (Fix cross section 13).

(2) Draw lines 14, 15, 16 to the center positions of the lenses 41a, 41b, 41c of each camera with the mesh intersection Pjk (xj, yk) as the starting point, find the positions where these lines 14, 15, 16 intersect each of the imaged images 51a, 51b, 51c, and determine the pixels 33a, 33b, 33c corresponding to those intersection positions (see FIG. 14). Then find the variance of the intensity (brightness) of these pixels 33a, 33b, 33c. In this case, the variance may be found for each color R, G, B; and variance may be found for just brightness.

Perform the processing to find this variance for each point (xj, yk) (j=0, 1, 2 n2; k=0, 1, 2 n3) on the X-Y plane 13. Then select the point where variance is less than or equal to the threshold value (may be zero) from among each point on the X-Y plane 13. Make this selected position Puv (xu, yv, zi).

(3) Incrementize i and repeat step (2).

The shape of the article 11 is established by connecting through interpolation, etc., each of the coordinate positions Puv attained in this way.

Also once each coordinate position Puv on the profile of the article 11 is known, the distance L from each position on the article 11 to each camera 41a, 41b, 41c can be found.

Furthermore the brightness and color of the surface of the article 11 can be determined on the basis of the brightness and hue data of the detected pixels 33a–33c corresponding to the profile coordinate position Puv of the article 11.

Moreover, in the case where the surface of the article is darker than the background, it is possible for measurement errors to occur with the aforementioned method for finding average value of intensity. This method is not problematic when the surface of the article is bright, but generally the method for finding variance is desirable.

The analysis results of the analyzing portion 5 are output to a display 8 and the article 11 is represented in three dimensions on the screen. In this case, contour lines may be added to the three-dimensional image (Step 204).

In the case of using the method for finding variance, the variance of the intensity of the pixels 33a–33c corresponding to that position P does not become less than or equal to the threshold value if a position P is a position on the profile of the article 11; as a result, errors occur in the measurement of the shape of and distance to the article 11. These are errors caused due to quantum errors or distortion of the camera lenses.

Figure 16:
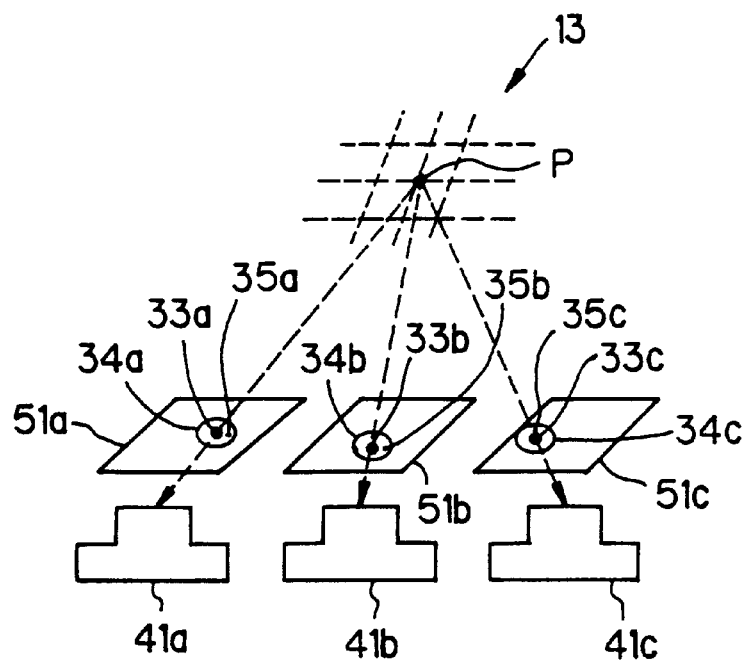
FIG. 16 is a diagram to explain the processing to improve errors in calculations by the sixth embodiment.
Figure 17:
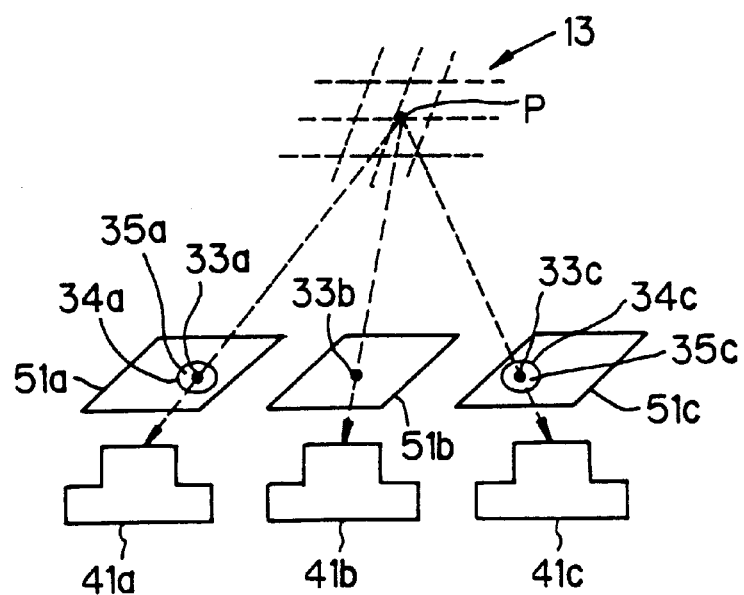
FIG. 17 is a drawing to explain the processing to improve errors in calculations by the sixth mode.

As shown in FIGS. 16 and 17, the measurement errors due to the aforementioned quantum errors, etc., may be corrected using detected data of pixels in the vicinity of the pixel corresponding to the position P.

The method shown in FIG. 16 is a method for setting vicinity areas 34a, 34b, 34c for each pixel 33a, 33b, 33c.

Specifically, the intensity of all pixels in the vicinity area 34a, the intensity of all pixels in the vicinity area 34b, the intensity of all pixels in the vicinity area 34c are compared; and the combination of pixels 35a, 35b, 35c where the variance of the intensity is lowest is selected. The pixel corresponding to the point P is corrected to the pixels 35a, 35b, 35c, not the pixels 33a, 33b, 33c.

The method shown in FIG. 17 is the method for setting one pixel 33b, from among each of the pixels 33a, 33b, 33c, as the standard and setting the vicinity areas 34a, 34c for the pixels 33a, 33c other than this standard pixel 33b.

Specifically, the intensity of the standard pixel 33b, the intensity of all pixels in the vicinity area 34a, and the intensity of all pixels in the vicinity area 34c are compared; and the combination of pixels 35a, 35b, 35c where the variance of the intensity is lowest is selected. The pixel corresponding to the point P is corrected to the pixels 35a, 35b, 35c, not the pixels 33a, 33b, 33c.

As above, this sixth embodiment can effect the calculations in a short time and complete the measurement in real time when finding the shape of and distance to an article 11 through calculation from the results of imaging with a plurality of cameras 41a, 41b, 41c (or imaging lens panel 40, imaging sensor array 50).

Figure 18:
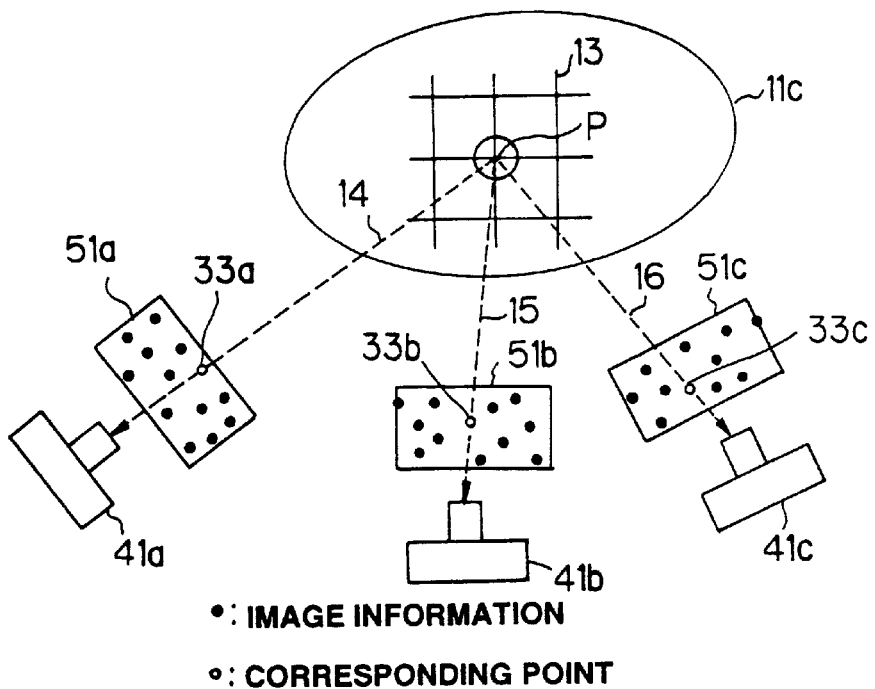
FIG. 18 is a drawing to show an outline of the constitution of the sixth embodiment.
Figure 19:
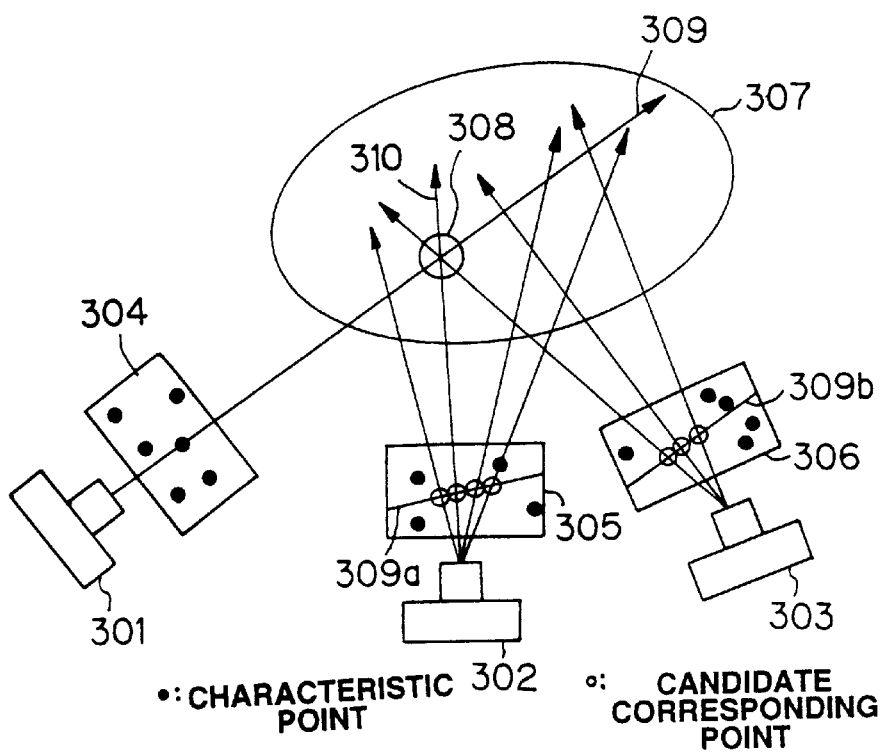
FIG. 19 is a drawing to show an outline of the prior art corresponding to the sixth embodiment.

The embodiment having these effects is confirmed by a comparison of FIG. 18, showing an outline of this sixth embodiment, and FIG. 19, showing the prior art for finding distance through calculation from the results of imaging with a plurality of cameras.

Specifically, the prior art in FIG. 19 must execute complex processing: finding a characteristic point on a reference image 304, finding a reverse projection 308 with that characteristic point as a starting point, and finding many reference reverse projections 310. Moreover, it is necessary to effect such complex processing for all characteristic points of a reference image 304 and the processing time becomes very long.

In the case of the sixth embodiment shown in FIG. 18, it is unnecessary to find a characteristic point as done in the prior art shown in FIG. 19 because pixels in the imaged image 51a–51c are determined if lines 14, 15, 16 are drawn to the lens centers of each camera 41a–41c with the mesh crossing point P as the starting point. Moreover the processing to draw many projections 309, 310 as done in the prior art shown in FIG. 19 becomes unnecessary if lines 14, 15, 16 are drawn.

In this way, the processing with the sixth embodiment is simpler than that with the prior art and the sixth embodiment can vastly reducing calculating time.

Seventh Embodiment

As discussed above, with the application of the sixth embodiment to find through calculations the distance to and shape of an article 11 from images from a plurality of cameras 41a, 41b, 41c, with the space 12 to be measured divided into each of the elements, there may be errors in measurement resulting from the article subject to measurement; that may be an item with little difference among portions of its surface or with surface characteristics that are difficult to capture: an item with little or no pattern on its surface, or an item with many similar patterns, etc.

Figure 20A:
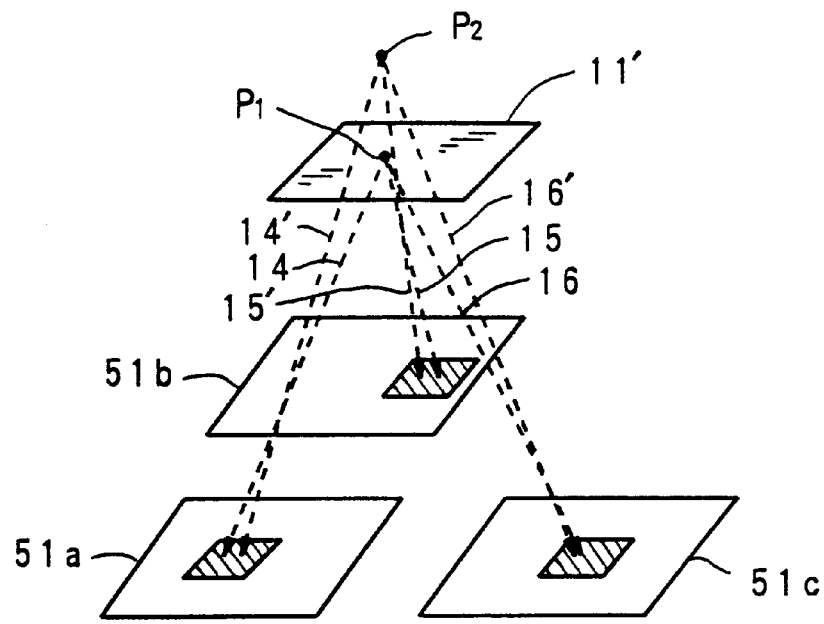
Figure 20B:
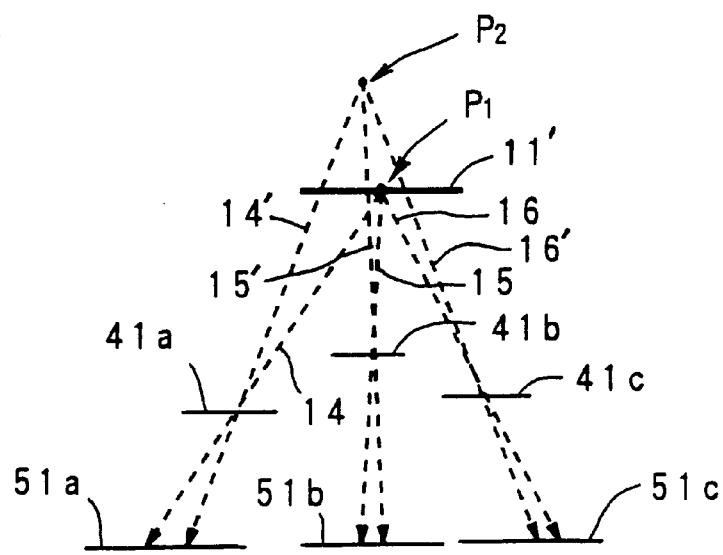

For example, when a black panel with no pattern on its surface is the article 11' subject to measurement as shown in the perspective view in FIG. 20(a) and the side view in FIG. 20(b), the variance of the intensity of each pixel corresponding to the mesh intersection point P1 on the article 11' sometimes becomes the same as the variance of the intensity of each pixel corresponding to the mesh intersection point P2 not present on the article 11'; sometimes an erroneous correspondence were the point P2 not on the profile of the article 11' is made the profile of the article 11'.

This erroneous correspondence is caused by the image information of each pixel corresponding to the point P1 and the image information of each pixel corresponding to the point P2 both being points which are black. In effect, this is an erroneous correspondence caused by the article 11' being an article with characteristics which are difficult to capture, in that the flat portion of the surface is entirely black.

It is an object of the seventh embodiment to be able to measure the distance to and shape of an article, precisely and accurately, even for an article with surface characteristics that are difficult to capture.

Figure 21A:
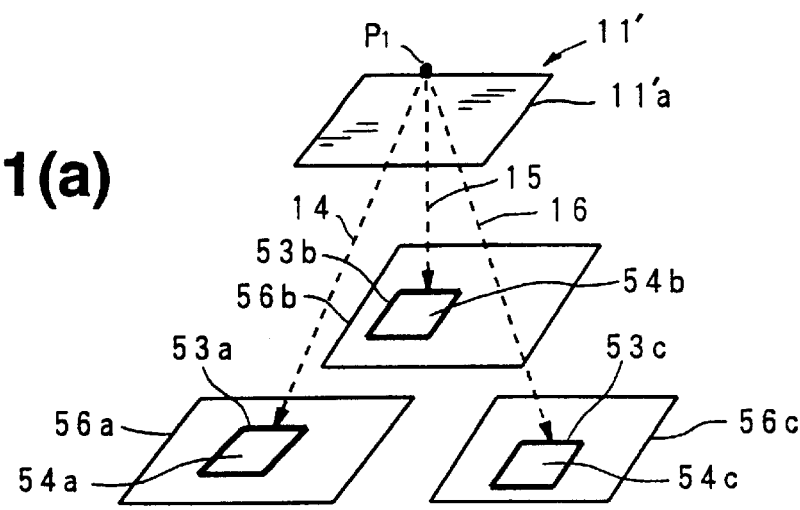

FIG. 21(a) shows an example of the present embodiment.

This example is constituted so as to generate an edge image 56a, 56b, 56c for each source image, without using the unprocessed source image of the imaged images 51a, 51b, 51c of each camera 41a, 41b, 41c.

Specifically, an image with the edge emphasized due to the application of a Gauss-Laplacian filter or a Sobel operator, etc., is generated for the source images 51a, 51b, 51c. In this image, the image information of the pixels 53a, 53b, 53c corresponding to the edge portion of the article 11' is made 1 and the image information of other pixels 54a, 54b, 54c is made 0; an edge image 56a, 56b, 56c showing only the edge of the article 11' is generated through this binarization.

Figures 23A, 23B:
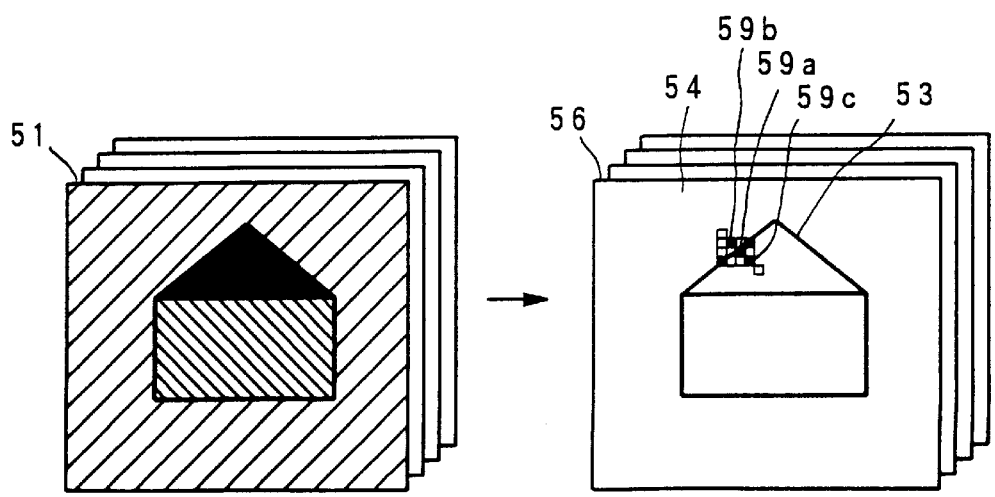

The FIGS. 23(a) and (b) show the situation of generating an edge image 56 comprising the pixels 53 of the edge portion and pixels 54 of other portions from the source image 51.

The following calculations are performed: find a pixels on the edge image 56a, 56b, 56c corresponding to the coordinate position of each element of the space 12; find the variance of the image information of the pixel found; and in the same way as the sixth embodiment, determine the coordinate position showing the profile of the article 11' from among each coordinate position in the space 12 and find the shape and distance to the article 11' on the basis of the determined coordinate position. In this case, when the pixels corresponding to the space dividing point are the pixels 53a, 53b, 53c corresponding to the edge portion, it is determined that this space dividing point (point P1) is the coordinate position showing the profile of the article 11' because the variance of the image information of these pixels becomes very small. Meanwhile, when the image information of the pixels among the edge pixels corresponding to the space dividing point include 0 (when it corresponds to pixels 54a, 54b, 54c), a large value (9999, for example) is established for the variance value and this space dividing point (point P2) is essentially deleted.

When measurement is effected on the basis of the edge image 56a, 56b, 56c in this way, erroneous correspondences are avoided even for an article with surface characteristics that are difficult to capture or with a flat surface; generation of a empty image (determining that the space dividing point P2 not on the article is the article) can be suppressed; and the shape of and distance to the article can be measured precisely and accurately. Moreover, processing can be fast because measurement is essentially performed only for the edge pixels 53a, 53b, 53c on the edge image.

There is no problem when the space allocation is fine and the precision of camera calibration is good. However there are the following problems when space allocation is coarse and camera calibration poor. Regardless of the fact that the space dividing point is on the profile of the article 11', the image information of the pixels on the edge image corresponding to the space dividing point might include 0, such a space dividing point is deleted, it becomes impossible to measure the distance for that space dividing point, and the number of measured points overall becomes low.

Figure 21B:
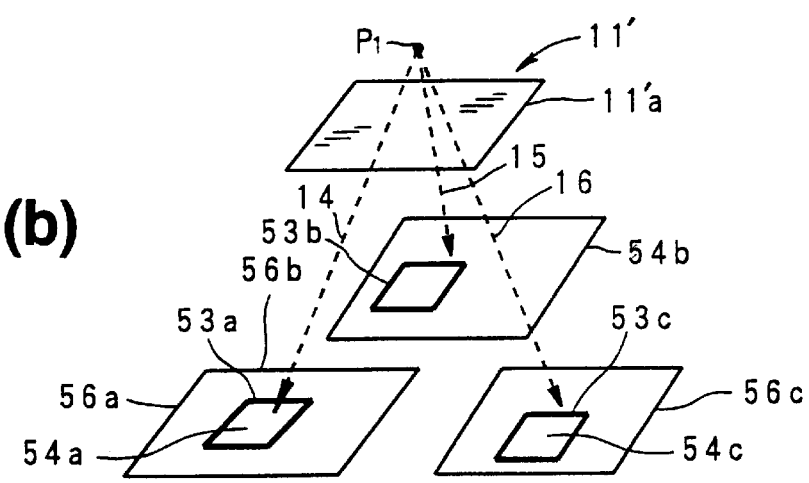

Specifically FIG. 21(b) shows the case where the space dividing point P1 is not present on the profile (vicinity of profile) of an actual article 11', when space allocation is rough although the precision of calibration for cameras 41a, 41b, 41c is good.

In effect the space dividing point P1 is the point closest to the profile of the article 11', but is not on or in the vicinity of the profile because space allocation is rough. Therefore, when the pixels corresponding to each camera 41a, 41b, 41c are found from the space dividing point P1, the space dividing point does not correspond to the pixels 53a, 53b, 53c corresponding to the edge portion and instead corresponds to the pixels 54a, 54b, 54c corresponding to portions other than the edge portion. Because the image information of the pixel on the edge image corresponding to the space dividing point P1 then becomes 0 and a large value (9999, for example) is established for the variance value, it is determined that the article 11' is not present there, although the space dividing point P1 is in the vicinity of the profile of the article 11'.

Figure 21C:
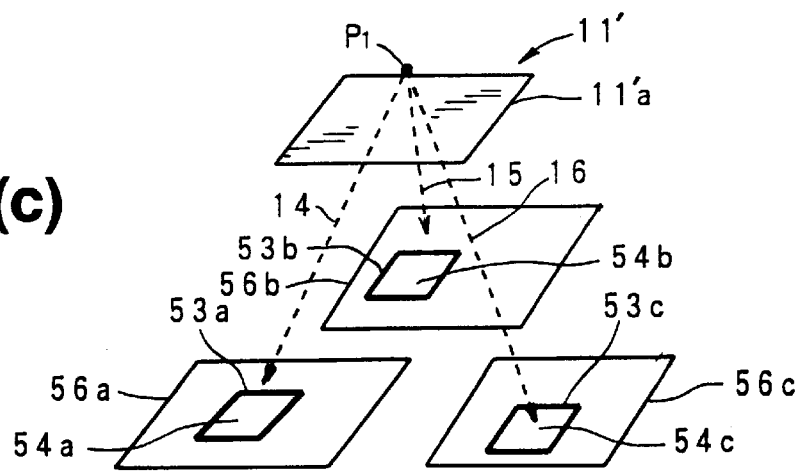

Also, FIG. 21(c) shows the case where the precision of calibration for cameras 41a, 41b, 41c is poor, although the space dividing point P1 is present on the profile (vicinity of profile) of the article 11'.

In this case too, like in FIG. 21(b), when the pixel corresponding to each camera 41a, 41b, 41c is found from the space dividing point P1 on the profile of the article 11', the space dividing point does not correspond to the pixels 53a, 53b, 53c corresponding to the edge portion, but instead to the pixels 54a, 54b, 54c corresponding to portions other than the edge portion. Because the image information of the pixel on the edge image corresponding to the space dividing point P1 then becomes 0 and a large value (9999, for example) is established for the variance value, it is determined that the space dividing point P1 is not a point on the profile of the article 11'.

Figure 22A:
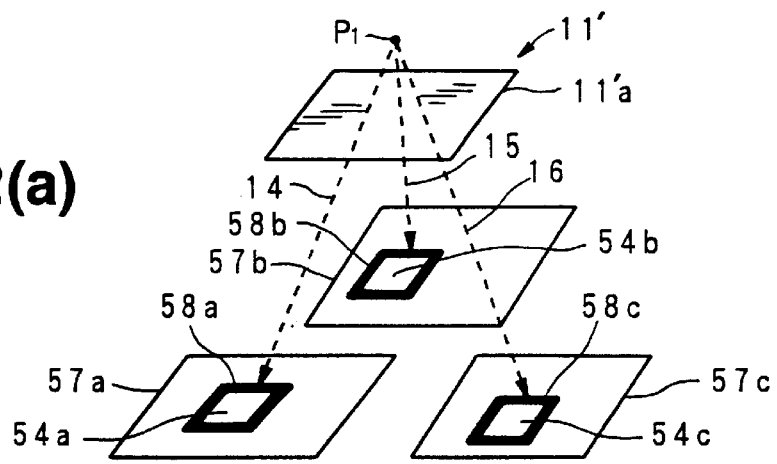
Figure 22B:
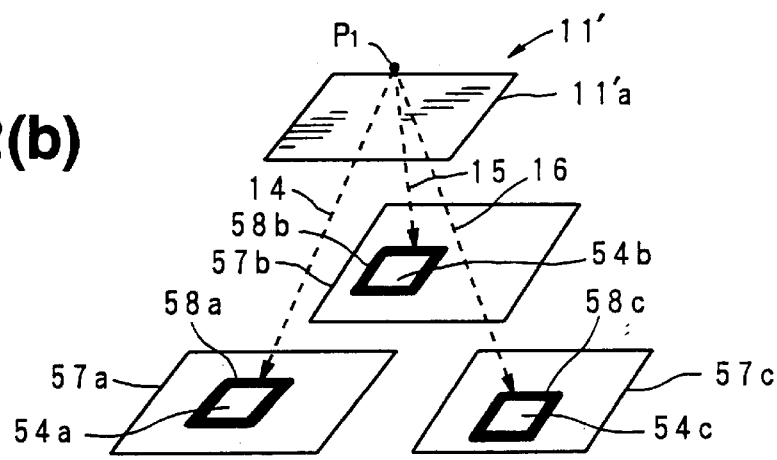

Such an erroneous determination makes it impossible to measure distance and the number of measured points overall becomes low. As shown in FIG. 22 (a) and (b), in order to avoid this, another example of the present embodiment is constituted to generate edge resolving images 57a, 57b, 57c, assuming that the pixels of the edge portion are pixels corresponding to the edge portion of the edge image and a prescribed number of pixels around that edge portion, and to effect measurement on the basis of the edge resolving images 57a, 57b, 57c.

In effect, with the source image 51 shown in FIG. 23 as an example, the image information for the n pixels, (including edge pixel 53; referred to as edge surrounding pixels) surrounding the pixel 53 corresponding to the edge portion of the edge image 56 attained from this source image 51, is made 1.

FIG. 23(b) is a figure to explain the processing to find the edge surrounding pixels. For each pixel in the edge image 56, it is determined whether the edge pixel 53 is included among pixels within distance n of that pixel, such as pixels adjacent on eight sides. As a result, when the edge pixel 53 is included, that pixel is designated an edge surrounding pixel. For example, pixels 59b, 59c are designated as edge surrounding pixels because the edge pixel 59a is included among pixels adjacent on those eight sides. Effecting measurement on the basis of the edge resolving images 57a, 57b, 57c including the edge surrounding pixels 58a, 58b, 58c attained in this way results in the following. Even when space dividing points are rough as shown in FIG. 22(a) and even when the precision of calibration for cameras 41a, 41b, 41c is poor, when pixels corresponding to each camera 41 from the space dividing point P1 on the article 11' are found, the correspondence of the space dividing point P1 with pixels 54a, 54b, 54c corresponding to portions other than the edge portion disappears, the space dividing point P1 corresponds to the edge surrounding pixels 58a, 58b, 58c (image information is 1) corresponding to the edge portion, and the space dividing point P1 is correctly determined to be a point on the profile of the article 11'.

This is explained using the cubic article shown in FIG. 26 as an example. When measurement is effected on the basis of the edge image 56, measurement can be effected only when the space dividing point corresponds to the edge pixel 53 (black dots indicate that the corresponding point matches the edge pixel 53; white dots indicate that the corresponding point matches a point other than the edge pixel 53); as a result, the number of measured points is very low (see FIG. 27(a)). On the other hand, when measurement is effected on the basis of the edge resolving image 57, measurement becomes possible when the space dividing point corresponds to the edge surrounding pixels expanding the edge portion beyond the edge pixel 53 (black dots indicate that the corresponding point matches the edge surrounding pixel 58; white dots indicate that the corresponding point matches a point other than the edge surrounding pixel 58). As a result, the number of measured points becomes high compared to the case of effecting measurement on the basis of the edge image 56 (see FIG. 27(b)).

As above, with another example of the present embodiment to effect measurement on the basis of an edge resolving image, the overall number of measured points becomes high compared to the case of effecting measurement on the basis of an edge image and it becomes possible to correctly measure the shape of and distance to an article, even when space allocation is rough or camera calibration is poor.

However the image information of the pixels of a derivative image attained from the source image and pixels of the source image, instead of image information of the edge pixels of the edge image, may be used as the image information of the edge surrounding pixel 58 of the edge resolving image 57.

Figure 24:
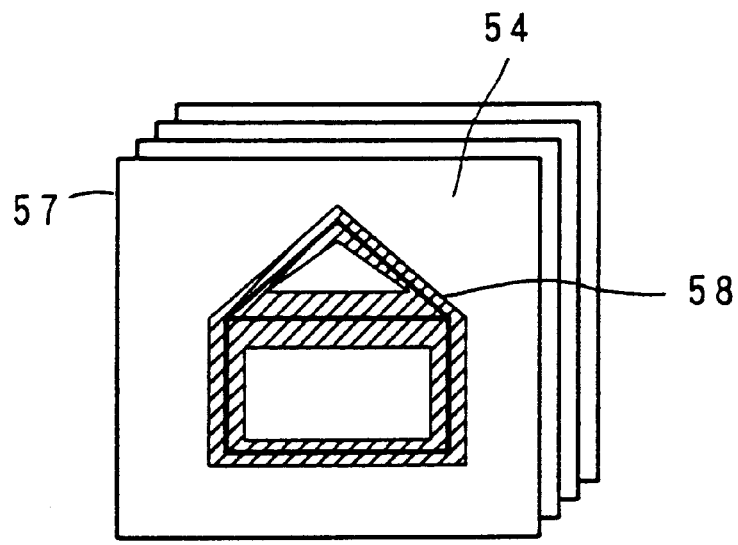

For example, as shown in FIG. 24, the edge resolving image 57 may also be generated by transposing the image information of the n pixels surrounding the pixel 53 corresponding to the edge portion of the edge image 53 shown in FIG. 23(b) with the image information of the pixels of the portion corresponding to the source image 51. Moreover, the image information for pixels other than the edge surrounding pixel 58 is 0.

Also, an edge resolving image 57 may be generated by Laplacian or LOG processing of the source image 51, generating a derivative image, and transposing the image information of n pixels surrounding the pixel 53 corresponding to the edge portion of the edge image 53 with the image information of a pixel on the edge portion corresponding to the derivative image.

Figure 25:
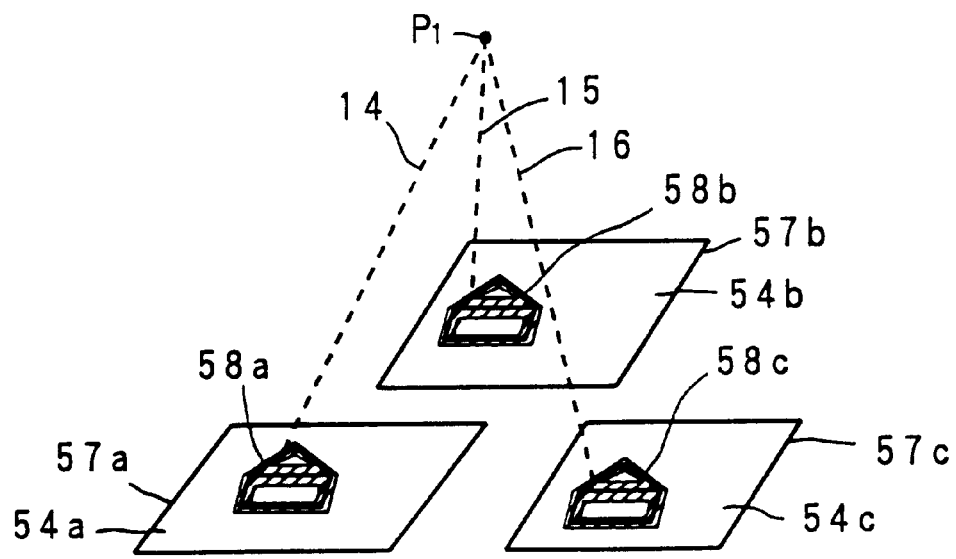

FIG. 25 shows the case of effecting measurement on the basis of the edge resolving images 57a, 57b, 57c wherein the image information of the edge surrounding pixels 58a, 58b, 58c are transposed with the image information of the pixels corresponding to the source images 51a, 51b, 51c.

Specifically, the calculations are to determine the coordinate position showing the profile of the article 11' from among each coordinate position in the space 12 and to find the shape of and distance to an article 11' on the basis of the coordinate position determined, in the same way as in the sixth embodiment, by finding the pixels on the edge resolving images 57a, 57b, 57c corresponding to the coordinate position of each pixel in the space 12 and finding the variance of the image information of the pixels found. In this case, the variance of the image information of the pixels is very low when the pixel corresponding to the space dividing point is the edge surrounding pixels 58a, 58b, 58c corresponding to the edge portion. Because of this, the space dividing point (point P1) is determined to be a coordinate position showing the profile of the article 11'. Meanwhile, when the image information of the pixels on the edge image corresponding to the space dividing point includes 0 (corresponds to pixels 54a, 54b, 54c), a large value (9999 for example) is established for the variance value and such a space dividing point is essentially deleted.

It is also possible to transpose the image information of the edge pixels 53a, 53b, 53c of the edge images 56a, 56b, 56c shown in FIG. 21(a) with the image information of the pixels corresponding to the source images 51a, 51b, 51c. It is also possible to transpose the image information of these edge pixels 53a, 53b, 53c with the image information of pixels corresponding to the derivative image attained from the source image.

Eighth Embodiment

The precision of measurement is improved in relation to the increase of the cross sections into which the measured space 12 is divided and the increase of the elements into which the cross sections are divided. However, simply increasing the number of cross sections of the measured space or raising the number of allocation elements in the cross sections for all cross sections 13, 13 would result in an increase to the amount of calculating time.

Increasing the number of cross sections or raising the number of allocation elements in the cross sections for only specific areas in the measured space 12 would efficiently improve the precision of measurement.

In this case, as a result of finding the variance of the intensity of the pixel corresponding to point P, the idea is that the number of cross sections is increased for only a specific area in the measured space 12 where the point P, where that variance is less than or equal to a prescribed threshold value, is present and the number of elements of the cross section 13 present in that specific area is increased.

Specifically, the precision of measurement can be effectively improved by effecting calculations and processing as follows. Because it is highly possible that the article 11 is present in the aforementioned specific area of the measured space 12, the number of cross sections and the number of elements in the cross section 13 are increased for only that specific area, the number of cross sections and number of elements in the cross section 13 are left unchanged for areas having little probability of including the article 11.

In carrying out the sixth embodiment to find through calculations the distance to and shape of an article from images from a plurality of cameras, with the space to be measured divided into each of the elements, the present embodiment determines whether an article is present in any area of the space during calculations, without uniformly dividing space, and increases the number of divisions and performs calculations and measurement for only the areas where it is determined that the article is present; therefore the present embodiment can decrease calculation time and improve the efficiency of measurement.

First Example (Case where article position is unknown)

FIG. 28(a)–(d) shows the method for dividing space in the case where the position of the article 11 is unknown (information not provided in advance to the distance measuring and shape measuring apparatus 10).

Figure 28A:
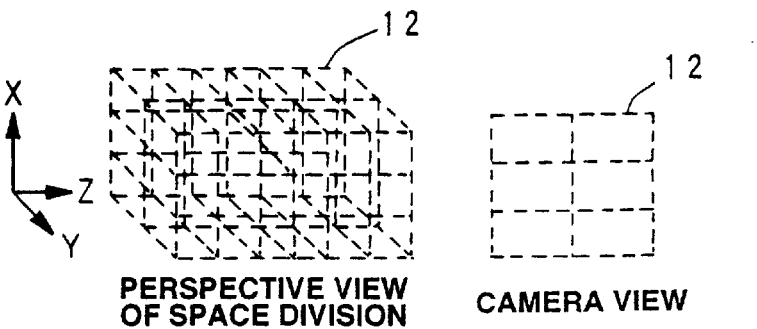
FIGS. 28 through 30 are drawings used to explain an eighth embodiment.

As shown in this FIG. 28(a), the entire space 12 surrounding the article 11 is roughly divided with nx number of divisions in the X axis direction, ny number of divisions in the Y axis direction, and nz number of divisions in the Z axis direction. In effect the number of divisions of the space 12 is nx ny nz.

Figure 28B:
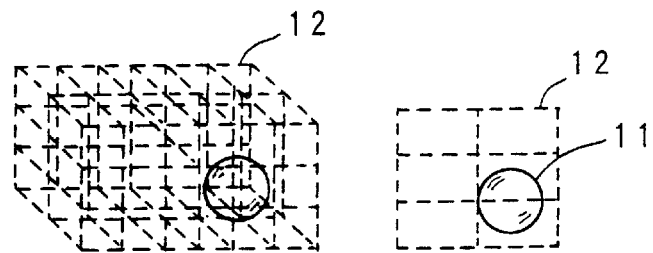

Next, as shown in FIG. 28(b), the variance of the intensity of the pixels corresponding to each space dividing point P in the space 12 divided as shown in FIG. 28(a) is found. From the results, the point P where the variance is less than or equal to a specified threshold value is found and the approximate position p of the article 11 is measured.

Then, as shown in FIG. 28(c), the area surrounding the point P where it is determined that the variance is less than or equal to a specified threshold value, in effect the surrounding area 12a where the article 11 is present, is selected from within the space 12. The whole of this specific area 12a is divided into nx number of divisions in the X axis direction, ny number of divisions in the Y axis direction, and nz number of divisions in the Z axis direction. In effect, the area 12a is divided into the same number of divisions, nx ny nz, as the space 12. However since the area 12a is smaller than the space 12, each divided element becomes smaller than those in FIG. 28(a) and is essentially more finely divided and the number of divisions increases.

Figure 28D:
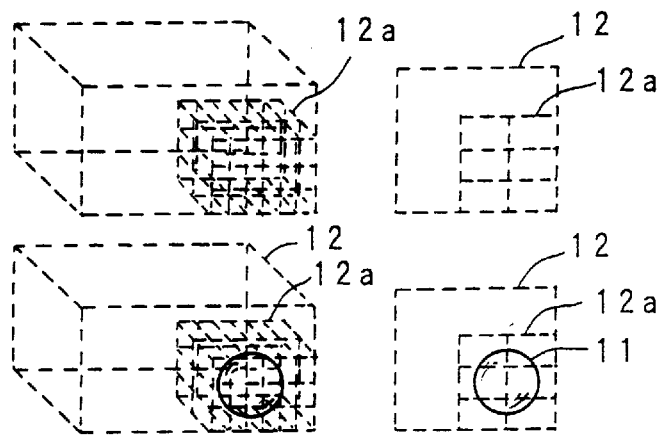

Then, as shown in FIG. 28(d), the variance of the intensity of the pixels corresponding to each space dividing point P in the area 12a established as in FIG. 28(c) is found; in the same way as in the sixth embodiment, the coordinate position P showing the profile of the article 11 is established from among each coordinate position P in the area 12a and the calculations are effected to find the shape and distance to the article 11 on the basis of the coordinate position P determined.

Figure 29A:
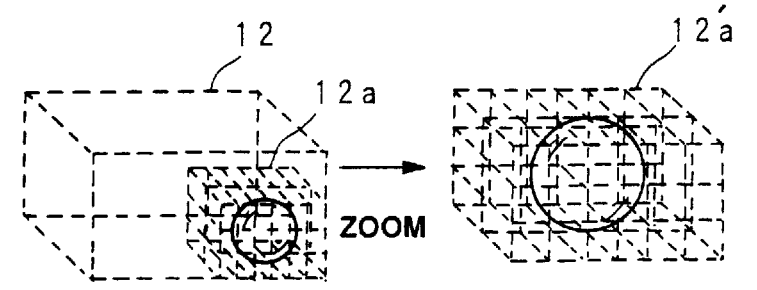
Figure 29B:
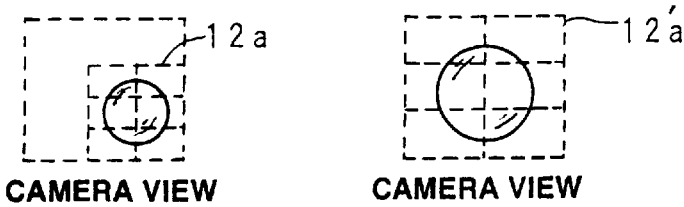

The precision of measurement can be further improved as follows. At the time when the processing in FIG. 28(b) is completed and the approximate position of the article 11 is determined, each camera 41a, 41b, 41c is oriented in the direction of the article 11 as shown in FIG. 29 and the zoom function is used; that being the case, the cameras become able to capture the article 11 with a sufficient size and in the central portion of the field of view of each camera 41a, 41b, 41c.

Second Example (Case of a moving body advancing in a straight path and measuring an article ahead in that path)

In this example, it is assumed that the distance measuring and shape measuring apparatus 10 of the sixth embodiment is on a moving body 150. In this case, the information that an article 11, subject to measurement, is present in front of and in the path of the moving body 150 is provided in advance to the measuring apparatus 10 of the moving body 150. The information that the travelling path of the moving body 150 is the straight path 151 is also provided in advance.

The necessity for information, as feedback information for guiding the travel of the moving body 150, decreases as the distance from the moving body 150 increases; the necessity for information increases as the distance from the moving body 150 decreases.

Figure 30A:
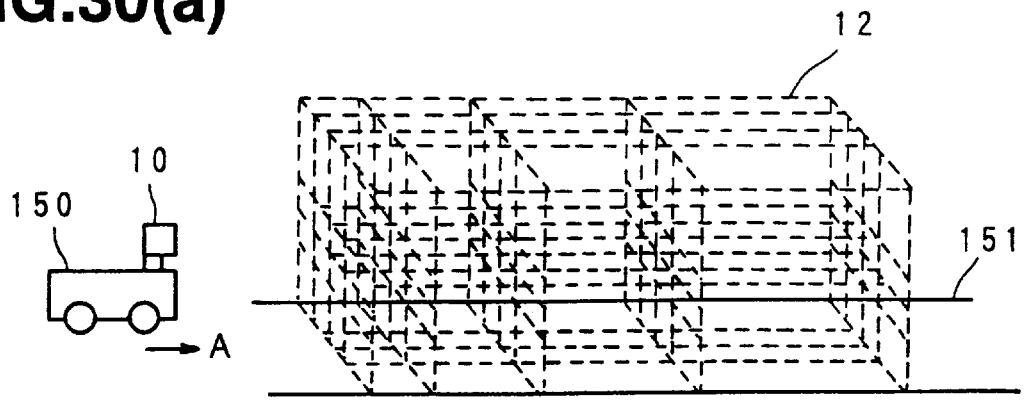

As shown in FIG. 30(a), a space 12, to surround the article to the front of the moving body 150, is established along the forward path 151 in the course A of the moving body 150. This space 12 is divided into a plurality of elements in such a manner that the number of divisions increases per uniform area as the distance from the moving body 150 decreases.

Figure 30B:
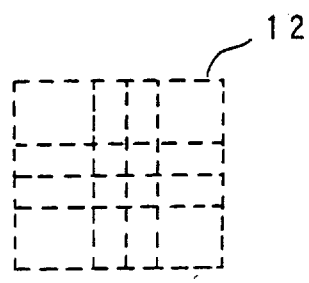

Feedback of information, such as the path being the straight path 151 and an obstacle being present in the center of the path of the moving body 150, is of great necessity. For this reason, the central portion of the cross section of the space 12 perpendicular to the path A of the moving body 150, is divided in such a manner that the number of elements per uniform area is greater than for the peripheral portion of the cross section, as shown in FIG. 30(b).

If the space 12 is divided in this way, then the coordinate position showing the profile of the article 11 is determined from the coordinate position of each element of the area 12 and the shape of and distance to the article 11 are found on the basis of the determined coordinate position, in the same way as with the sixth embodiment.

Third Example (Case of a moving body advancing in a curved path and measuring an article ahead in that path)

In this example like in the aforementioned second example, it is assumed that the distance measuring and shape measuring apparatus 10 of the sixth embodiment is on a moving body 150. In this case, the information that an article 11, subject to measurement, is present in the path ahead of the moving body 150 is provided in advance to the measuring apparatus 10 of the moving body 150. The information that the travelling path of the moving body 150 is the curved path 152 is also provided in advance.

Figure 30C:
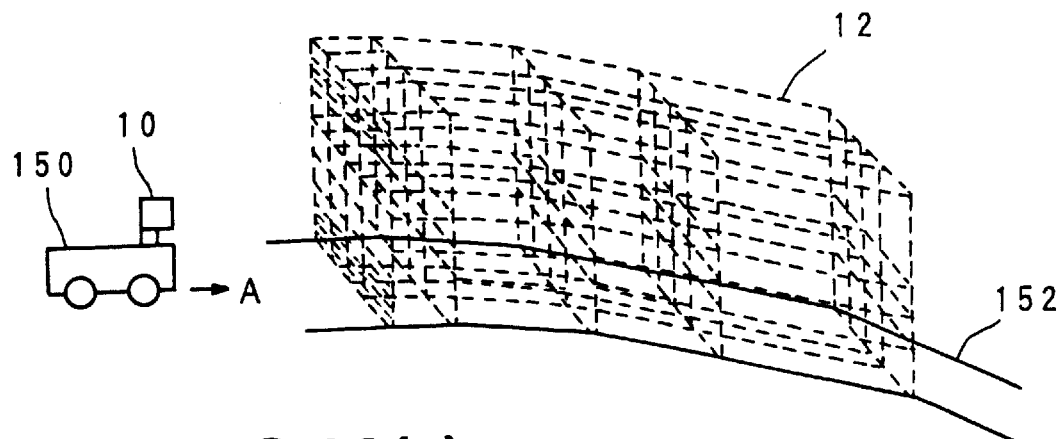

In this example like in the aforementioned second example, as shown in FIG. 30(c), a space 12, surrounding the article to the front of the moving body 150, is established along the forward path 152 in the course A of the moving body 150. This space 12 is divided into a plurality of elements in such a manner that the number of divisions increases per uniform area as the distance from the moving body 150 decreases.

Feedback of information such as the path being the curved path 152 and an obstacle being present in the center of the path of the moving body 150 is of great necessity. For this reason, the peripheral portion of the cross section of the space 12 perpendicular to the path A of the moving body 150, is divided in such a manner that the number of elements per uniform area is greater than for the central portion of the cross section, as shown in FIG. 30(b).

If the space 12 is divided in this way, then the coordinate position showing the profile of the article 11 is determined from the coordinate position of each element of the area 12 and the shape of and distance to the article 11 are found on the basis of the determined coordinate position, in the same way as with the sixth embodiment.

In carrying out the sixth embodiment to find through calculations the distance to and shape of an article from images from a plurality of cameras, with the space to be measured divided into each of the elements, the present embodiment provides the information, the determination of whether an article is present in any area of the space, without uniformly dividing space, and increases the number of divisions and performs calculations and measurement for only the areas where it is determined that the article is present; therefore the present embodiment can decrease calculation time and improve the efficiency of measurement.

Moreover the present embodiment may be carried out in combination with the seventh embodiment.

Moreover the present embodiment presumes the cubic measured space 12 (see FIG. 14), but may also be carried out using the four-sided cone-shaped measured space 12' (see FIG. 15).

Ninth Embodiment

The seventh embodiment is constituted so as to generate an edge image 56 and edge resolving image 57 from the source image 51 and to effect measurement on the basis of the edge image 56 and edge resolving image 57 (see FIGS. 23, 24).

To be sure, the advantage of using such a measurement method is that only the characteristic portion of the article is captured and measurement can be effected accurately and with the suppression of virtual images. However, information of the article surface for portions other than the characteristic portion, in effect information on the flat portions of the article surface, is not attained and the shape of and distance to the entire article cannot be confirmed.

Meanwhile, laser radar, which scans a space in three dimensions, is widely known as a measuring apparatus to measure the distance to the flat portion of an article surface.

However, laser radar is constituted to attain the distance to an article by measuring the time it takes for a laser beam to travel to and return from an article. For this reason, a requisite for distance measurement is the laser beam reflecting off the article returning in the same direction from which it came. Therefore, although distance measurement is possible for flat portions of the article surface, from which the laser beam reflects and returns in the same direction, distance measurement is not possible for edge portions of the article surface from which the laser beam is reflected in four directions and does not return in the same direction.

When either measuring apparatus is used alone, it is not possible to attain detailed, three-dimensional distance information for an entire article.

The present embodiment has installed a flat portion distance measuring apparatus such as laser radar, to measure the distance to the flat portions of an article surface, as well as the distance measuring and shape measuring apparatus of the seventh embodiment. The present embodiment is able to measure the distance to each position of an article surface on the basis of the results of measuring the distance to the edge portions of the article surface, attained with the distance measuring and shape measuring apparatus, and the results of measuring the distance to the flat portions of the article surface, attained with laser radar (flat portion distance measuring apparatus).

Figure 31:
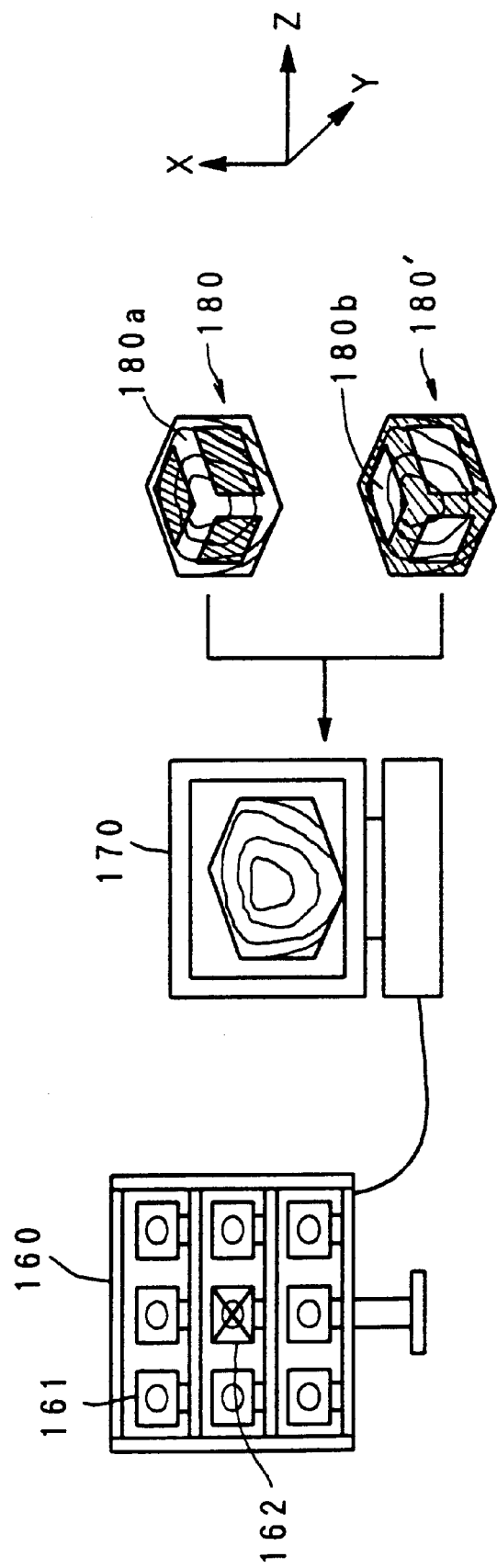
FIG. 31 is a drawing used to explain a ninth embodiment.

FIG. 31 shows an example of the constitution of the apparatus of the present embodiment. The measuring unit 160 has a plurality of CCD cameras 161, 161, . . . , like the cameras 41a, 41b, 41c in the seventh embodiment, and a laser laser 162 for scanning space in three dimensions, installed in the center. Moreover the plurality of CCD cameras 161, 161, . . . and laser laser 162 may be separate.

The processing computer 170 matches the measurement results from the laser radar 162 with the measurement results from the plurality of CCD cameras 161, 161, . . . in the measurement unit 160, calculates the distance to each position on the surface of the article 11, and outputs the distance information for the entire surface of the article 11 to a display screen, etc. Specifically, if the article 11 has a cubic shape as shown in FIG. 31, the distance information for only the edge portion (shown in white) of the article 11 is attained as the measurement results 180 from the CCD cameras 161, 161, . . . and distance information for only the flat portion (shown in white) of the article 11 is attained as the measurement results 180' of the laser radar 162.

The procedures for the processing executed with the processing computer 170 are explained below.

Moreover, as in FIG. 14, the X-Y-Z coordinate system is established so that the direction of the Z axis is the same as the direction of measurement of the article 11.

The distance z1 at each coordinate position (x, y) of the article 11 is input serially by the CCD cameras 161, 161, . . .

Next, the laser radar 162 scans in three dimensions and the distance z2 at each coordinate position (x, y) of the article 11 is input serially by the laser radar 162.

Next the distance z at each coordinate position (x, y) of the article 11 is calculated as follows from the aforementioned input distance data z1 (x, y) and z2 (x, y).

(1) In the case where both distance data z1 (x, y) and z2 (x, y) are attained at the same coordinate position (x, y), z (x, y)=(½) (z1 (x, y)+z2 (x, y))

(2) In the case where distance data z1 (x, y) is not attained and distance data z2 (x, y) is attained at the same coordinate position (x, y), z (x, y)=z2 (x, y)

(3) In the case where distance data z1 (x, y) is attained and distance data z2 (x, y) is not attained at the same coordinate position (x, y), z (x, y)=z1 (x, y)

(4) In the case where neither distance data z1 (x, y) and z2 (x, y) is attained at the same coordinate position (x, y), z (x, y)=Measurement not possible The distance z to each position (x, y) on the surface of the article 11 is measured as discussed above.

With the present embodiment, the addition of a measuring apparatus such as laser radar, able to measure flat portions of an article surface which are difficult to measure, to the measuring apparatus in the seventh embodiment complements the measuring apparatus in the seventh embodiment and makes it possible to measure the entire surface of the article 11.

Moreover, the present embodiment may be carried out in combination with the eighth embodiment.

Tenth Embodiment

The distance between the distance measuring apparatus and article sometimes changes according to the situation.

The following problems are brought about by handling this change in distance with a conventional stereo camera system (method using stereo vision).

This stereo camera system has two or more cameras established in proximity and measures distance by corresponding the subject article with each screen through triangulation.

Such a stereo camera system effects stereo matching, that is finding similar areas on the screens, because the image information is from only two cameras. Consequently, a problem is that erroneous matches are easily made in the case of similar patterns being on the screens.

Other problems are that the precision of measuring a distant article is poor if the cameras are established in proximity and conversely, the matching of a nearby article is difficult to capture if the cameras are far apart.

Meanwhile, even if three or more cameras are established in order to reduce erroneous matches in stereo matching, the problem still remains because the precision of measuring a distant article is poor if the cameras are established in proximity and conversely, the matching of a nearby article is difficult to capture if the cameras are far apart.

With this conventional stereo matching system, it is not possible to precisely measure the distance to an article which is either close or far.

It is an object of the present embodiment to be able to maintain the precision of measurement at or above a prescribed level, regardless of the distance from the measuring apparatus to the article.

Figure 33A:
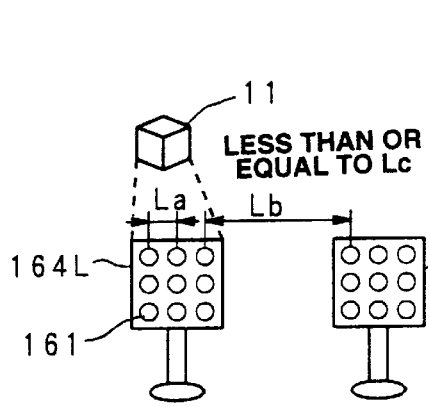
Figure 33B:
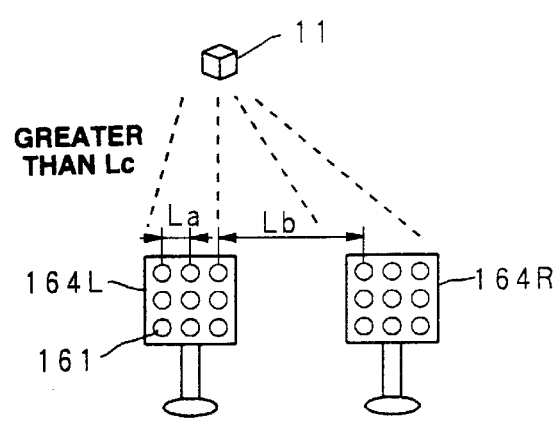

In the present embodiment, as shown in FIGS. 33(a) and 33(b), there are at least two modules 164L, 164R, wherein a plurality of cameras 161 of the measuring apparatus of the sixth embodiment are established at a distance from each other of the prescribed distance La between cameras; and the modules 164L, 164R are established so that the distance between the camera 161 of module 164L and the camera 161 of the module 164R adjacent thereto becomes the distance Lb which is greater than or equal to the aforementioned prescribed distance La between cameras. In the case where the distance from the modules 164L, 164R to the article 11 is less than or equal to the prescribed distance Lc between the module and article, a plurality of modules is selected from among two or more modules 164L, 164R, so that the distance to one module 164L or between the two modules farthest apart becomes less than or equal to the prescribed distance between modules. In the case where the distance from the modules 164L, 164R to the article 11 is greater than the prescribed distance Lc between the module and article, a plurality of modules is selected from among two or more modules 164L, 164R, so that the distance between the two modules farthest apart becomes greater than the prescribed distance between modules. Then the distance to and shape of an article 11 is measured using the cameras 161 installed in the selected modules.

FIG. 32(a)–(d) shows examples of constitutions where the number of modules and number of cameras in one module are different.

Figure 32A:
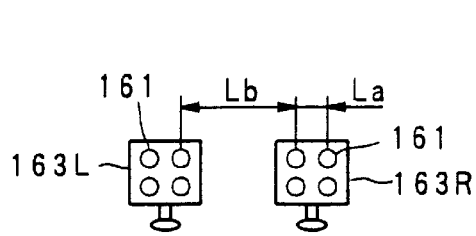
FIGS. 32 and 33 are drawings used to explain a tenth embodiment.

FIG. 32(a) shows an example where two modules 164L, 164R, wherein four cameras 161 are separated from each other at a prescribed distance La between cameras, are prepared and two modules 163L, 163R are arranged so that the distance between camera 161 in one module 163L and camera 161 in the other module 163R becomes the distance Lb, greater than or equal to the aforementioned prescribed distance La between cameras.

Figure 32B:
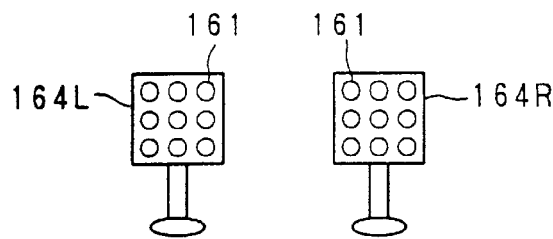

FIG. 32(b) shows an example where the modules 163L, 163R in FIG. 32(a) are changed to modules 164L, 164R with the number of cameras in each module increased to nine.

Figure 32C:
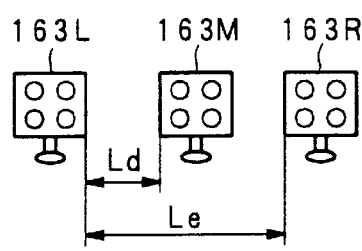

FIG. 32(c) shows an example where an identical module 163M is added to modules 163L, 163R in FIG. 32(a). The distance between neighboring modules is the same as the case in FIG. 32(a).

Figure 32D:
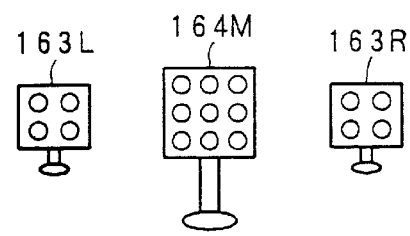

FIG. 32(d) shows an example where a module 164M, identical to those in FIG. 32(b), is added to modules 163L, 163R in FIG. 32(a). The distance between neighboring modules is the same as the case in FIG. 32(a).

Moreover the aforementioned constitution is an example and the combination used is arbitrary so long as there are two or more modules and two or more cameras in the modules. Also, each module is separate, but the constitution may combine each module in a single unit.

FIG. 33(a), (b) shows the situation where measurement is effected using a measuring apparatus having the constitution shown in FIG. 32(b).

As shown in FIG. 33(a), in the case where the distance from the modules 164L, 164R to the article 11 is less than or equal to the prescribed distance Lc between module and article, in effect a short distance, one module 164L is selected from the two modules 164L, 164R and the distance to and shape of the article 11 are measured using the cameras 161 in the selected module 164L.

When the distance to the article 11 is short like this, erroneous correspondences are avoided because the distance is measured from the results of imaging by cameras with the distance between the cameras 161 being the short distance La.

Moreover, if the module 164L is turned so that each camera 161, 161 of the aforementioned selected module 164L faces the article 11 and the zoom function is used, it becomes possible to capture the article 11 with a sufficient size and in the central portion of the field of view of each camera 161 and the precision of measurement can be further improved.

Moreover in FIG. 33(a), module 164L is selected, bu the other module 164R may also be selected.

As shown in FIG. 33(b), in the case where the distance from the modules 164L, 164R to the article 11 is greater than the prescribed distance Lc between module and article, in effect a long distance, two modules 164L, 164R are selected and the distance to and shape of the article 11 are measured using the cameras 161 in these selected modules 164L, 164R.

When the distance to the article 11 is long like this, the precision of measuring long distances is improved because the distance is measured from the results of imaging by cameras with the distance between the cameras 161 being the long distance Lb.

Moreover, if the modules 164L, 164R are turned so that each camera 161, 161, . . . of the aforementioned selected modules 164L, 164R faces the article 11 and the zoom function is used, it becomes possible to capture the article 11 with a sufficient size and in the central portion of the field of view of each camera 161 and the precision of measurement can be further improved.

When the measuring apparatus having the constitution shown in FIG. 32(c) is used, three modules 163L, 163M, 163R may be selected and the far article 11 measured.

Also, in the case in FIG. 32(c), distance measurement may also be effected with the following constitution. In the case where the distance to the article is less than or equal to the prescribed distance Lc between module and article, two modules 163L, 163M or two modules 163M, 163R (distance between modules Ld) are selected from among three modules 163L, 163M, 163R so that the distance between the two most separated modules becomes less than or equal to the prescribed distance between modules. On the other hand, in the case where the distance to the article 11 is greater than the prescribed distance Lc between module and article, two modules 163L, 163R or three modules 163L, 163M, 163R (distance between modules Le) are selected from among three modules 163L, 163M, 163R so that the distance between the two most separated modules becomes greater than the prescribed distance between modules.

The present embodiment is able to sustain the precision of measurement at a prescribed level or better regardless of the distance from the measuring apparatus to the article.

As explained above, the first invention of the present invention can effect distance measurement with good precision even without sufficient calibration. Also, the entire apparatus becomes small and the problem of oversizing can be avoided.

Also, the second invention of the present invention can effect distance measurement with an apparatus having a simple constitution even in the case of measuring the distance to the surface of a complex article. Also, the measurement can be completed in a short time without requiring time for calculations, etc.

Also, the third invention of the present invention is able to effect calculations in a short period of time, when finding through calculations the distance to and shape of an article from images from a plurality of cameras. For this reason, it is able to complete measurement in real time.

Also, the fourth invention of the present invention is able to measure precisely and accurately the distance to an shape of an article, even an article with surface characteristics that are difficult to capture.

Also, with the application of the third invention of the present invention to find through calculations the distance to and shape of an article from images from a plurality of cameras, with the space to be measured divided into each of the elements, the fifth invention of the present invention can decrease calculation time and improve the efficiency of measurement because it increases the number of divisions and performs calculations and measurement for only the areas where it is determined that the article is present, without uniformly dividing space.

Also, with the measuring apparatus of the fourth invention of the present invention, the sixth invention of the present invention complements the measuring apparatus of the fourth invention with the addition of a measuring apparatus, able to measure the flat portion of the surface of an article that is difficult to measure, and can effect measurement of the entire surface of an article.

Also, the seventh invention of the present invention is able to sustain the precision of measurement at a prescribed level or better regardless of the distance from the measuring apparatus to the article.

INDUSTRIAL APPLICABILITY

The distance and shape measuring apparatus of the present invention can be installed on any body such as a robot, moving body, etc., and can improve the reliability of robots, moving bodies, etc., on which it is installed.

We claim:

1. A distance measuring apparatus for measuring a distance from a reference plane to a laser lit position by beaming a laser beam from a laser oscillator to an article and sensing a reflected laser beam, characterized in that the apparatus comprises:

a lens array including a plurality of lenses having identical lens characteristics and disposed at uniform intervals on a plane, the lens array having a hole formed within the plane for allowing passage of the laser beam projected from the laser oscillator;

a photodetector array including a plurality of photodetectors disposed on a plane and corresponding to each lens constituting the lens array, the photodetectors in the photodetector array being disposed at a distance of a focal length of the lens from the lenses in the lens array, the photodetector array having a hole formed within the plane for allowing passage of the laser beam projected from the laser oscillator;

the laser oscillator projecting the laser beam toward the article in such a manner that a direction of the laser beam becomes perpendicular to the photodetector array and the lens array and that the laser beam passes through each of the holes formed in the photodetector array and the lens array;

the lens array, the photodetector array, and the laser oscillator being disposed in front of the article so as to be separated from the article in that order; and calculating means for calculating an effective area on the photodetector array on the basis of an output of each photodetector in the photodetector array, when the laser beam reflected from the article is sensed by the photodetector array via the lens array, and for calculating a distance from the lens array to the article on the basis of the effective area and an angle of view of the lenses constituting the lens array.

2. The distance measuring apparatus according to claim 1 wherein the laser oscillator is disposed so that the laser beam is beamed directly to the article without passing through the photodetector array and the lens array, whereby the holes in the photodetector array and the lens array are omitted.

3. A distance measuring apparatus for measuring a distance from a reference plane to a laser lit position by beaming a laser beam from a laser oscillator to an article and sensing the reflected laser beam, characterized in that the apparatus comprises:

a lens array including a plurality of lenses having identical lens characteristics and disposed at uniform intervals on a sphere;

a photodetector array including photodetectors disposed on a sphere and corresponding to each lens constituting the lens array, the photodetectors in the photodetector array being disposed at a distance of a focal length of the lens from the corresponding lenses in the lens array;

the lens array and the photodetector array being disposed in front of the article so as to be separated from the article in that order and so that an interior of the sphere of the lens array faces an exterior of the sphere of the photodetector array; and calculating means for calculating an effective area on the photodetector array on the basis of an output of each photodetector in the photodetector array, when the laser beam reflected is projected from the laser oscillator toward the article and the laser beam reflected from the article is detected by the photodetector array via the lens array, and for calculating a distance from the lens array to the article on the basis of this effective area and an angle of view of the lenses constituting the lens array.

4. The distance measuring apparatus according to claim 3 wherein the calculating means calculates a direction of the article with a direction in which the article is present being a direction of a line segment connecting a spherical center of the photodetector array or the lens array to a center of the effective area of the photodetector array or the area on the lens array corresponding to the effective area.

5. A distance and shape measuring apparatus characterized in that the apparatus comprises:

an imaging lens array including a plurality of lenses disposed on a plane;

an imaging photodetector array including photodetectors disposed on a plane and having prescribed resolutions corresponding to each lens constituting the imaging lens array, the photodetectors in the photodetector array being disposed at a distance of a focal length of the lens from the corresponding lenses in the lens array;

a reproducing lens array including a plurality of lenses disposed on a plane and having lens characteristics identical to lenses constituting the imaging lens array;

a reproducing emitter array including emitters disposed on a plane and corresponding to each lens constituting the reproducing lens array and having the same size as the photodetectors constituting the imaging photodetector array, the emitters of the emitter array being disposed at a distance of a focal length of the lens from corresponding lenses in the reproducing lens array;

a reproducing sensor array including a plurality of photodetectors disposed on a plane, for sensing light passing through the reproducing lens array;

the imaging lens array, the imaging photodetector array, the reproducing emitter array, the reproducing lens array, and the reproducing sensor array being disposed in front of the article so as to be separated from the article in that order;

transferring means for transferring an output of each photodetector in the imaging photodetector array to each corresponding emitter in the reproducing emitter array and causing emission by the emitters, when the light reflected by the article passes through the imaging lens array and is sensed with the imaging photodetector array;

moving means for moving the reproducing sensor array in a direction of distance measurement for the article, when the light emitted by the reproducing emitter array passes through the reproducing lens array and is sensed with each photodetector of the reproducing sensor array; and calculating means for calculating a distribution of an intensity of light sensed with each photodetector of the reproducing sensor array for each position to which the reproducing sensor array is moved and for calculating a distance to the article from the imaging lens array and a shape of the article on the basis of the light intensity distribution for each position.

6. The distance and shape measuring apparatus according to claim 5 wherein the imaging sensor array and the reproducing emitter array are configured with a unit plane which passes light incident from a front side and radiates from a back side, whereby the transferring means is made unnecessary.

7. The distance and shape measuring apparatus according to claim 5 wherein a reducing optical system, for reducing by a prescribed reduction ratio a reproduced image of the article reproduced with the reproducing sensor array, is disposed between the reproducing lens array and the reproducing sensor array.

8. The distance and shape measuring apparatus according to claim 5 wherein a reproduced image of the article reproduced with the reproducing sensor array is reduced by a prescribed reduction ratio, by an arrangement in which each emitter of the reproducing emitter array is reduced by the prescribed reduction ratio, while each lens of the reproducing lens array is reduced by the prescribed reduction ratio, and the transferring means is so constituted that it transfers an output of each photodetector of the imaging sensor array to each corresponding emitter of the reproducing emitter array so that an imaged image of the imaging sensor array is reduced by the prescribed reduction ratio and appears as an emission image on the reproducing emitter array.

9. A distance and shape measuring apparatus characterized in that the apparatus comprises:

an imaging lens array including a plurality of lenses disposed on a plane;

an imaging sensor array including photodetectors disposed on a plane and having a prescribed resolution and corresponding to each of the lenses constituting the imaging lens array, the photodetectors of the photodetector array being disposed at a distance of a focal length of each lens from corresponding lenses of the imaging lens array; and calculating means for calculating pixels of an imaged image of the photodetectors corresponding to a coordinate position of each element in space on the basis of a positional relationship between the lenses in the imaging lens array and the photodetectors in the imaging photodetector array, for determining coordinate positions representing a profile of the article from among the coordinate positions in the space by comparing image information of the pixels found, and for finding a distance to and a shape of the article on the basis of the coordinate positions determined.

10. The distance and shape measuring apparatus according to claim 9 wherein a plurality of cameras is provided in such a manner that the lenses constituting the imaging lens array are lenses of each camera and imaged images of the plurality of photodetectors constituting the imaging photodetector array are imaged images of the camera.

11. The distance and shape measuring apparatus according to claim 9 further comprising edge image generating means for generating an edge image for the imaged image, and wherein the calculating means, by using the edge image instead of the imaged image, finds pixels on the edge image corresponding to a coordinate position of each element in space, determines the coordinate position representing a profile of the article from among each coordinate position in the space by comparing image information of the pixels found, only in a case where the pixels found are pixels corresponding to an edge portion in the edge image, and performs calculations to find a distance to and a shape of the article on the basis of the coordinate positions determined.

12. The distance and shape measuring apparatus according to claim 9 further comprising:

edge image generating means for generating an edge image for the imaged image; and edge resolving means for generating an edge resolving image wherein pixels corresponding to an edge portion of the edge image and a prescribed number of pixels on a periphery of the edge portion are presumed to be pixels of the edge portion, and wherein the calculating means, by using the edge resolving image instead of the imaged image, finds pixels on the edge resolving image corresponding to a coordinate position of each element in space, determining the coordinate position representing a profile of the article from among the coordinate position of each element in the space by comparing image information of the pixels found, only in a case where the pixels found are pixels corresponding to the edge portion in the edge resolving image, and performs calculations to find a distance to and a shape of the article on the basis of the coordinate positions determined.

13. The distance and shape measuring apparatus according to claim 9 further comprising:

edge image generating means for generating an edge image for the imaged image; and edge resolving image generating means for generating an edge resolving image wherein image information of pixels corresponding to an edge portion of the edge image is transposed with image information of corresponding pixels of a source image of the imaged image; and wherein the calculating means, by using the edge resolving image instead of the imaged image, finds pixels on the edge resolving image corresponding to a coordinate position of each element in space, determines a coordinate position representing a profile of the article from among coordinate positions of each element in the space by comparing image information of the pixels found, only in a case where the pixels found are pixels corresponding to the edge portion in the edge resolving image, and performs calculations to find a distance to and a shape of the article on the basis of the coordinate positions determined.

14. The distance and shape measuring apparatus according to claim 13 wherein the edge resolving image generating means presumes, as pixels of an edge portion, pixels corresponding to the edge portion of the edge resolving image and a prescribed number of pixels on a periphery of the edge portion, and generates the edge resolving image in which image information of the pixels presumed to be the edge portion is transposed with image information of corresponding pixels of a source image of the imaged image.

15. The distance and shape measuring apparatus according to claim 9 further comprising:

derivative image generating means for generating a derivative image of the imaged image;

edge image generating means for generating an edge image for the imaged image; and edge resolving image generating means for generating an edge resolving image in which image information of pixels corresponding to the edge portion of the edge image is transposed with image information of pixels corresponding to the derivative image, and wherein the calculating means, by using the edge resolving image instead of the imaged image, finds pixels on the edge resolving image corresponding to a coordinate position of each element in space, determines a coordinate position representing a profile of the article from among a coordinate position of each element in the space by comparing the image information of the pixels found, only in a case where the pixels found are pixels corresponding to the edge portion in the edge resolving image, and performs calculations to find a distance to and a shape of the article on the basis of the coordinate positions determined.

16. The distance and shape measuring apparatus according to claim 15 wherein the edge resolving image generating means presumes, as pixels of an edge portion, pixels corresponding to the edge portion of the edge resolving image and a prescribed number of pixels on a periphery of the edge portion, and generates the edge resolving image in which image information of the pixels presumed to be the edge portion is transposed with image information of corresponding pixels of the derivative image.

17. The distance and shape measuring apparatus according to claim 9 comprising:

first dividing means for setting a space surrounding the article and for dividing the space into a plurality of elements; wherein the calculating means finds pixels in the imaged image corresponding to coordinate positions of each element of the space divided with the first means for dividing, determines coordinate positions representing a profile of the article from among each of the coordinate positions in the space by comparing the image information of the pixels determined, and finds a distance to and a shape of the article on the basis of the determined coordinate positions;

determining means for determining whether the article is present in which area of the space on the basis of results of calculations in progress by the calculating means;

second dividing means for dividing into a further plurality of elements those elements divided by the first dividing means, for an area, in which the article is present, of the space where it is determined that the article is present; and wherein the calculating means finds pixels in the imaged image corresponding to coordinate positions of each element of the area where the article is present and which is divided by the second dividing means, determines coordinate positions representing a profile of the article from among each of the coordinate positions of the area where the article is present by comparing the image information of the pixels found, and finds a distance to and a shape of the article on the basis of the coordinate positions determined.

18. The distance and shape measuring apparatus according to claim 9 wherein the distance and shape measuring apparatus is mounted on a moving body and used to measure the distance to and shape of an article present in front of and in the path of the moving body; wherein the apparatus comprises:

dividing means for setting a space so as to enclose the article in front of the moving body, along the path before the moving body and for dividing the space into a plurality of elements so that a number of divided elements per a uniform area increases in relation to the nearness of a distance from the moving body; and wherein the calculating means finds pixels in the imaged image corresponding to coordinate positions of each element of the space divided by the dividing means, determines coordinate positions representing a profile of the article from among the coordinate positions of each element of the space by comparing image information of the pixels determined, and finds a distance to and a shape of the article on the basis of the coordinate positions determined.

19. The distance and shape measuring apparatus according to claim 9 wherein the dividing means divides a central portion of a cross section, perpendicular to the direction of the moving body in the space, so that the number of divided elements per uniform area becomes high compared to a peripheral portion of the cross section, when the forward path of the moving body is a straight path.

20. The distance and shape measuring apparatus according to claim 9 wherein the dividing means divides a peripheral portion of a cross section, perpendicular to the direction of the moving body in the space, so that the number of divided elements per uniform area becomes high compared to a central portion of the cross section, when the forward path of the moving body is a curved path.

21. The distance and shape measuring apparatus according to claim 11 wherein flat portion distance measuring device for measuring a distance to a flat portion of a surface of the article, is disposed other than the distance and shape measuring apparatus, for measuring a distance to each position of the surface of the article on the basis of results of measuring the distance to the edge portion of the surface of the article, attained with the distance and shape measuring apparatus, and results of measuring the distance to the flat portion of the surface of the article, attained with the flat portion distance measuring apparatus.

22. The distance and shape measuring apparatus according to claim 21 wherein the flat portion distance measuring apparatus is a laser radar for scanning space in three dimensions.

23. The distance and shape measuring apparatus according to claim 10 wherein:

at least two modules, in which the plurality of cameras is disposed so that cameras are separated from each other by a prescribed distance between cameras, are disposed in such a manner that a distance from a camera of one module to a camera of an adjacent module is a distance greater or equal to the prescribed distance between cameras;

plurality of modules are selected from among the two or more modules, so that a distance to one module or between two modules farthest apart becomes less than or equal to the prescribed distance between modules, when a distance from the module to the article is less than or equal to a prescribed distance between module and article;

plurality of modules are selected from among the two or more modules, so that a distance between the two modules farthest apart becomes greater than the prescribed distance between modules, when the distance from the modules to the article is greater than the prescribed distance between module and article; and a distance to and a shape of the article are measured by using the cameras installed in the selected modules.

* * * * *